United States Patent

[11] 3,603,746

[72] Inventors Robert B. Heick
Eatontown;
Henry Mann, Holmdel, both of, N.J.
[21] Appl. No. 879,498
[22] Filed Nov. 24, 1969
[45] Patented Sept. 7, 1971
[73] Assignee Bell Telephone Laboratories, Incorporated
Murray Hill, N.J.

[54] MEASUREMENT OF AVERAGE DUTY CYCLE
13 Claims, 34 Drawing Figs.

[52] U.S. Cl. .......... 179/175.2 A, 178/69 A, 324/140 D
[51] Int. Cl. .......... H04m 3/08
[50] Field of Search .......... 179/175.2 A, 175.2 R; 178/69 A; 324/140 D

[56] References Cited

UNITED STATES PATENTS

| | | | |
|---|---|---|---|
| 3,243,526 | 3/1966 | La Barge et al. | 179/175.2 A |
| 3,410,967 | 11/1968 | Boring | 179/175.2 A |

*Primary Examiner*—Kathleen H. Claffy
*Assistant Examiner*—Douglas W. Olms
*Attorneys*—R. J. Guenther and James Warren Falk

ABSTRACT: Digital technique is used to control four clock pulse counters for measuring an approximation of the average percent break or the pulsing speed over a series of telephone dial pulse periods. For percent break, up-counter B serially counts pips of frequency $100f$ during the sum of nine break intervals, the total B count is placed as the same count in reentrant down-counter A and counter B is cleared. Counter D accumulates pips of frequency $f$ during the entire time of nine pulse periods. Dividing circuitry causes down-counting in counter A and up-counting in counter C under the control of a high-speed clock. Counter C is recycled each time it accumulates a count equal to the count in counter D. Down-counting in A and up-counting in C are stopped when A down-counts from zero to capacity count. The number of recyclings of counter C is registered in the cleared counter B as a percent. Fractional control circuitry takes into account any remainder in counter C. Visual display is provided of the answer in percent. For pulsing speed, a prescribed count is placed in down-counter A and the accumulated count in counter D corresponding to the nine pulse periods is used as in percent break to provide an answer approximating the pulsing speed.

INVENTORS: R.B. HEICK
H. MANN
BY [signature]
ATTORNEY

NAND

NAND

INVERTER

INVERTER

LOGICAL AND

LOGICAL AND

DELAY

DELAY

DELAY

SINGLE SHOT

SINGLE SHOT

SINGLE SHOT

DELAYED SINGLE SHOT

DELAYED SINGLE SHOT

DELAYED SINGLE SHOT

REGENERATION

REGENERATION

REGENERATION

JK FLIP-FLOP

D-TYPE FLIP-FLOP

MEASUREMENT OF AVERAGE DUTY CYCLE

BACKGROUND OF THE INVENTION

The field of the present invention is the art of electrical signal measurement and particularly the measurement of the duty cycle of signals occurring among others in a series. Specifically, the present invention enables measurement of the average time interval between alternate consecutive pairs of signals among an odd series of such signals in terms of a percentage of the average time period between consecutive odd signals. The particularly pertinent field of the invention is in the area of measuring average percent break over a series of telephone dial pulses or the like.

Prior art, such as U.S. Pats. No. 1,964,526 to Melsheimer of June 26, 1934, No. 2,428,488 to Ghormley of Oct. 7, 1947, No. 3,123,679 to Donville et al. of Mar. 3, 1964 and No. 3,410,967 to Boring of Nov. 12, 1968, has employed analog methods of measuring percent break where the usual condenser charging or discharging is used to acquire a voltage for comparison (by a meter, for example) with another voltage to ascertain whether the percent break over a series of pulse periods or the percent break of a single pulse period is too high, too low or within prescribed limits. Such prior art, while suitable for its intended purpose, provides means for only qualitative answers in terms of whether the percent break (duty cycle) is above, below or within some prescribed value or range.

Other prior art, such as U.S. Pats. No. 2,216,730 to Berger of Oct. 8, 1940 and No. 3,243,526 to La Barge et al. of Mar. 29, 1966, has employed digital technique for measuring some aspects of the duty cycle problem. However, such prior art has required some mental calculations to arrive at the answer.

An application of H. Mann, Ser. No. 879,282, for "Measurement of Average Duty Cycle," filed on Nov. 24, 1969 and allowed on Mar. 3, 1971, discloses and claims an arrangement for producing a quantitative answer for each series of pulse periods tested, where the quantitative answer is determined solely by the series of pulse periods tested, and where no mental operations are required other than reading the answer from a visual display.

The Mann arrangement uses clock-controlled digital technique to control two binary-coded decimal counters and a large shift register. One counter counts clock pips at a frequency of 100*f* for the sum of all breaks while the shift register accumulates clock pips at a frequency of *f* for all pulse periods. The 100*f* count is then transferred as the nine's complement to the second counter and the *f* count in the shift register is repeatedly and successively added into the second counter until the latter exceeds its capacity. The number of successive additions is an approximation of percentage break.

An arrangement like that of Mann requires the two counters to be engineered so that the registering or counting codes are self-complementing decimal codes to enable the transfer of a count from one counter to the other as the nine's complement in order to enable the nine's complement counter to ascertain, by complementary addition, when the transferred count is exceeded. Also, while the shift register of Mann is satisfactory functionally, the large size required is not desirable in the most economical design.

The present invention provides an arrangement similar to that of Mann except that the special self-complementing decimal coding is not necessary and except that the use of a large shift register is obviated, each of which simplifications renders the equipment engineering less complicated and more economical.

SUMMARY OF THE INVENTION

The present invention contemplates clock-controlled digital technique for automatically measuring the average time interval between alternate consecutive pairs of signals among an odd series of such signals in terms of a percentage of the average time period between consecutive odd signals. Two pulse count registers are provided, one register controlled to contain a pulse count at a (10 times *x*) *f* clock pulse frequency (where *x* is an integer) indicative of the sum of all time intervals, the other register controlled to contain a pulse count at a clock pulse frequency of *f* indicative of the sum of all time periods: the *f* count is repeatedly and successively subtracted from the (10 times *x*) *f* count so as to dissipatively reduce the (10 times *x*) *f* count to zero; and, means is provided for counting the number of successive subtractions as indicative of a percent.

More particularly, the (10 times *x*) *f* frequency is 100*f*, the 100*f* register is a down counter, the *f* counter is an up counter, and a high-speed clock is used to down-count in the 100*f* counter while up-counting in a separate dividing counter: the dividing counter is recycled each time it counts a number of clock pulses equal to the count in the *f* counter; and, the number of recyclings of the dividing counter which occur by the time the count in the 100*f* down counter is completely dissipated is registered as a percent.

Still more particularly, a count comparator is provided for comparing the count in the dividing counter with the count in the *f* counter; and, the comparator recycles the dividing counter each time the compared counts are the same and registers the numbers of such recyclings.

Still more particularly, logic circuitry is provided for deriving, from any count remaining in the dividing counter when the 100*f* count is completely dissipated, a fraction signal representative of the approximate fraction the remaining count is of the *f* count.

BRIEF DESCRIPTION OF THE DRAWING

The drawing consists of FIGS. 1 through 34 arranged on 11 sheets as follows.

DETAILED DESCRIPTION

The detailed description to follow is arranged in four main sections: the Circuit Symbols; the Signals; the Block Diagram; and, the Detailed Circuit Disclosure. These matters will be taken up in the above order under the appropriate headings.

Circuit Symbols

The following, under suitable headings, explain conventions and symbols as used in the detailed circuit layout of FIGS. 28 through 33. In explaining the action of the circuit components, it is assumed that they are connected as shown in FIGS. 28 through 33. The diagrams used to explain the action of the components are not intended to represent true waveforms, but merely to illustrate the logic level functions of the components in the context of FIGS. 28 through 33.

Battery and Ground

A circle with a plus sign (+) indicates the positive terminal of a source of direct current supply, the negative terminal of which is assumed to be connected to ground, which is considered as zero potential. The direct current voltage is 5 volts unless otherwise indicated.

Detached Contacts

A crossmark (X) on a conductor indicates a pair of electrical contacts associated with a switch. The contacts complete the circuit path when the switch is operated and open the circuit when the switch is not operated (released).

High and Low Signals

A potential condition, whether steady or transient, is said to be a high logic level if it is 2 volts or more positive. A low logic level condition is a voltage not more positive than about one-half of a volt.

NAND Gate

Figure 2:
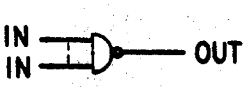
FIGS. 2 through 26 show circuitry and symbols as used in the detailed circuit disclosure of FIGS. 28 through 33.

FIG. 2 shows the symbol for a typical NAND gate such as Motorola integrated circuit MC 830 and the like.

Figure 3:
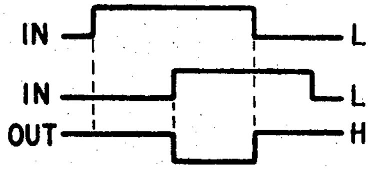

FIG. 3 shows the circuit action of the NAND gate. The output will be low only if all inputs are high: otherwise, the output will be high.

Inverter

Figure 4:
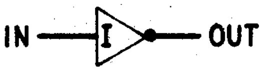

FIG. 4 shows the symbol for a typical inverter such as Motorola integrated circuit MC 836 and the like.

Figure 5:
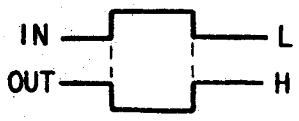

FIG. 5 shows the circuit action of the inverter. The output will be the inverse of the input. That is, a low input produces a high output and a high input produces a low output.

Logical AND

Figure 6:
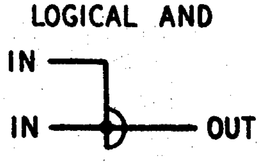

FIG. 6 shows the symbol used to indicate an electrical connection referred to as a "collector tie," which is the electrical paralleling of outputs from two or more NAND gates or inverters or both.

Figure 7:
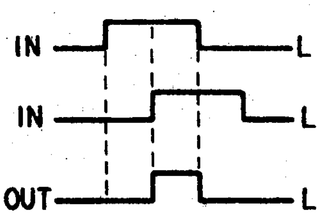

FIG. 7 shows the effect of the logical AND connection. The output is high only when all inputs are high: otherwise, the output is low.

Delay

Figure 8:
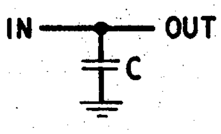

FIG. 8 shows how a capacitor can be connected to a conductor such that a delay is attached to each low-to-high transition. The amount of delay is a function of the value of the capacitor C and the amount and nature of connecting circuits.

Figure 9:
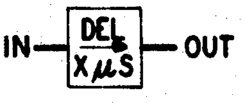

FIG. 9 shows the symbol for a delay circuit with an arrow pointing in the direction of the effect of the delay. The symbol includes the amount of delay (microseconds μsec. or milliseconds msec.) where pertinent.

Figure 10:
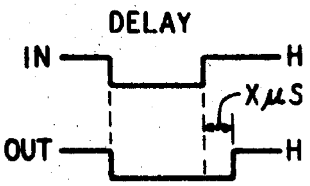

FIG. 10 shows the action of the delay circuit. A low-to-high transition at the input is delayed by $x$ μsec. at the output due to a controllable charging time of capacitor C. No delay to speak of is experienced at the output by a high-to-low transition at the input since the discharge path of capacitor C is arranged to be very fast.

Single Shot

Figure 11:
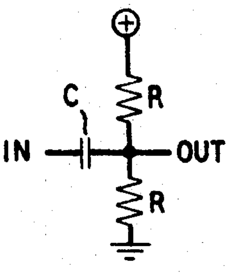

FIG. 11 shows how a single-shot circuit may be made to produce a high-to-low output of a specified short width from a longer high-to-low input.

Figure 12:
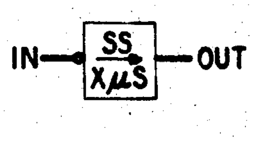

FIG. 12 shows the symbol for a single shot like that of FIG. 11.

Figure 13:
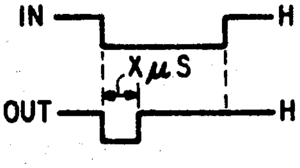

FIG. 13 shows the circuit action of the single shot. A high-to-low transition at the input will produce at the output a high-to-low transition lasting for $x$ μsec. Normally, the output is high by virtue of the resistance divider. Low-to-high transitions at the input will not affect the logic level of the output. However, a high-to-low transition of the input will at once provide a high-to-low transition at the output, followed by a charging time of $x$ μsec. for condenser C to charge up to the high level.

Delayed Single Shot

Figure 14:
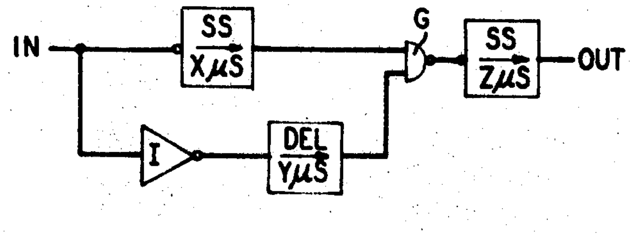

FIG. 14 shows how a delayed single-shot circuit may be made to produce a high-to-low output of a specified short width delayed a specified time from the controlling high-to-low transition of a longer input.

Figure 15:
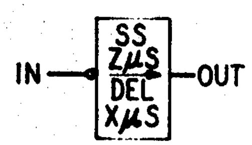

FIG. 15 shows the symbol of a delayed single-shot circuit like FIG. 14.

Figure 16:
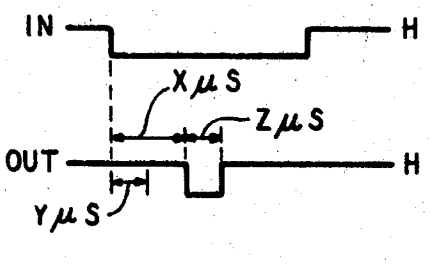

FIG. 16 shows the circuit action of the delayed single-shot. Under steady-state conditions, the output is high from the single shot Z. No change at the input, except a high-to-low, will affect the logic level of the output. When a high-to-low input occurs, the upper input of gate G will go low for $x$ μsec. and then return to high and the lower input of gate G will stay low for $y$ μsec. and will then go high. When both inputs of gate G go high (at the end of $x$ μsec.) the output of gate G will go low to cause the output to produce a single-shot low pulse of $z$ μsec. Thus, the high-to-low input has caused the output to delay $x$ μsec. and then to produce a single-shot low of $z$ μsec.

Regeneration Circuit

Figure 17:
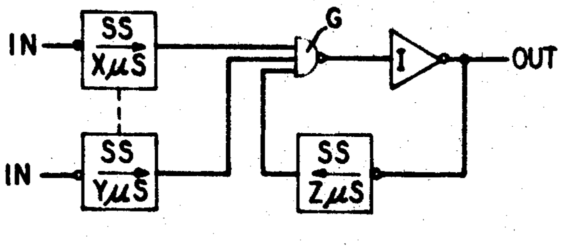

FIG. 17 shows how a regeneration circuit may be made for producing a relatively long high-to-low output from a shorter high-to-low input.

Figure 18:

FIG. 18 shows the symbol for a regeneration circuit for producing a pulse of $z$ μsec. width.

Figure 19:
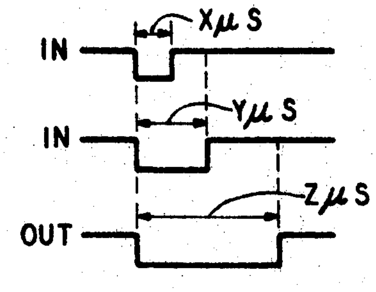

FIG. 19 shows the circuit action of a regeneration circuit like FIG. 17. Under steady-state conditions the three inputs to gate G are high, thus producing a low input to the inverter and a high output. No change on any input, except a high-to-low transition, will affect the logic level of the output. A high-to-low input to single shot $x$ will produce at the upper input to gate G a high-to-low pulse lasting $x$ μsec. Similarly, a high-to-low input to single shot $y$ will produce at the middle input to gate G a high-to-low pulse lasting $y$ μsec. The leading edge (high-to-low) of either of these inputs to gate G will cause the output of gate G to go high and the output of the inverter to go low. The single-shot $z$ will produce at the lower input of gate G a high-to-low pulse lasting $z$ μsec., which holds the output of G high and the output of the inverter low until the end of the $z$ μsec. interval, at which time all three inputs of gate G will again be high. This will cause the output of the inverter to again be high.

JK Flip-Flop

Figure 20:
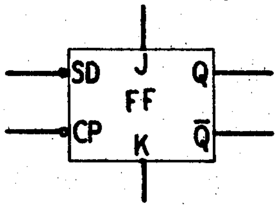

FIG. 20 shows a typical JK flip-flop such as Motorola integrated circuit MC 853 and the like. SD is the direct set input, CP is the clock pulse input, Q is the "1" output, and $\bar{Q}$ is the "0" output. Q and $\bar{Q}$ are inversions: $\bar{Q}$ will always be the opposite of Q: if Q changes, $\bar{Q}$ will change. Whenever SD is low, a direct set condition prevails with Q high and $\bar{Q}$ low. Whenever SD is high and CP is low, changes in the J and K information will not affect the state of Q and Q. Whenever SD is high, a high-to-low transition on CP will change the state of Q and $\bar{Q}$ or not depending upon the condition of inputs J and K. The J and K information is assumed to be changed, if at all, while the CP lead is low. The following indicates the action of the circuit with SD high, the J and K information established, and the CP lead going from high-to-low. If J and K are low, Q does not change. If J is low and K is high, if Q is low it will stay low and if Q is high it will go low. If J is high and K is low, if Q is high it will stay high and if Q is low it will go high. If J and K are high, Q changes (toggles). The above information is summarized in the following table:

| SD | CP | J | K | Q | $\bar{Q}$ |
|---|---|---|---|---|---|
| L | X | X | X | H | L |
| H | L | X | X | √ | √ |
| H | P | L | L | √ | √ |
| H | P | L | H | L/L | H/H |
| H | P | L | H | H/L | L/H |
| H | P | H | L | L/H | H/L |
| H | P | H | L | H/H | L/L |
| H | P | H | H | L/H | H/L |
| H | P | H | H | H/L | L/H |

Figure 21:
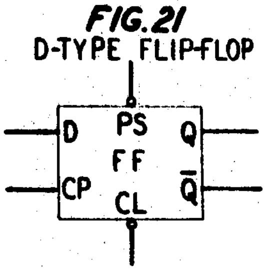

P ... means a pulse from high-to-low
L ... means low
H ... means high
√... means no change of state
L/H, etc. ... means a change of state
H/H, etc. ... means no change of state
X ... means not controlling D-Type Flip-Flop FIG. 21 shows a typical D-type flip-flop such as Texas Instruments integrated circuit SN 7474 and the like. D is the data input, CP is the clock pulse input, PS is the preset input, CL is the clear input, Q is the "1" output, and $\bar{Q}$ is the "0" output. With PS low and CL high, a preset condition exists with Q high and $\bar{Q}$ low. With PS high and CL low, a clear condition exists with Q low and $\bar{Q}$ high. With PS high and CL high, Q is made the same as the high or low condition of the D input when CP is pulsed low-to-high. At all other times, Q and $\bar{Q}$ are unaffected by changes on the D input. The following table summarizes the above:

| CP | D | PS | CL | Q | $\overline{Q}$ |
|---|---|---|---|---|---|
| X | X | L | H | H | L |
| X | X | H | L | L | H |
| P | L | H | H | L | H |
| P | H | H | H | H | L |

Figure 22:
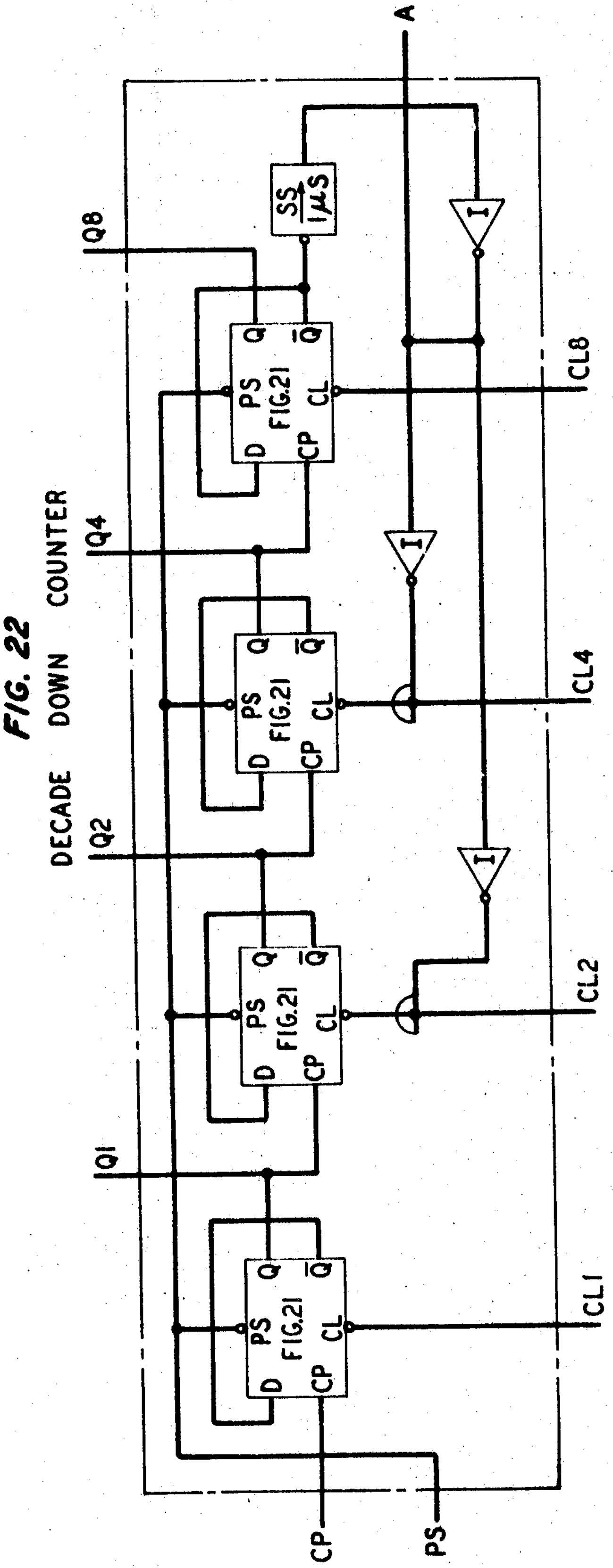
Figure 23:
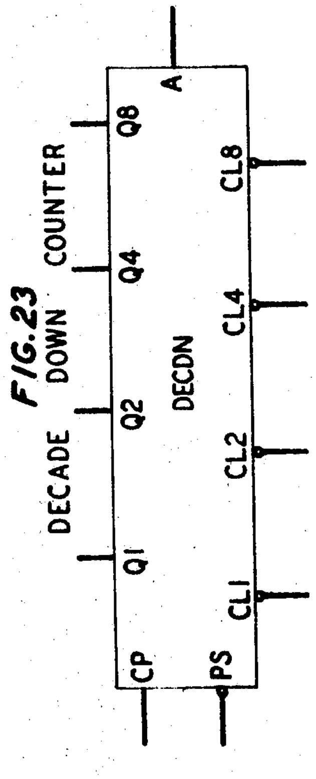

P ... means a pulse from low-to-high
L ... means low
H ... means high
X ... means not controlling Decade Down-Counter FIG. 22 shows how flip-flops like FIG. 21 may be arranged as a decade down-counter, the symbol for which is shown in FIG. 23. The CL1, CL2, CL4, and CL8 inputs are normally high. The preset lead PS is normally high: making the PS lead low will preset all flip-flops to Q high and $\overline{Q}$ low. The A output is normally low: the A output will carry a short high pulse whenever the Q8 stage changes to Q high and $\overline{Q}$ low. The clock pulse lead CP is effective to control the flip-flops only when the CP lead is pulsed low-to-high.

With the leads CL1, CL2, CL4, and CL8 high, whenever PS goes from high-to-low all stages are preset to Q high and $\overline{Q}$ low. With PS high, any lead CL1, CL2, CL4, or CL8 going low will clear the corresponding stage to Q low and $\overline{Q}$ high. The CL-leads are used to set the down-counter to a certain decimal value, such as nine (1001, using decimal weighings of 1, 2, 4 and 8 for Q1, Q2, Q4 and Q8).

With a value set in the down-counter, such as nine with Q1 high, Q2 low, Q4 low and Q8 high (1001), with input PS high, and with all CL-inputs high, positive (low-to-high) pulses on input CP will cause the down-counter to down-count to zero (0000). The next clock pulse will set the counter to its maximum count of 15 (all stages set to their one states—1111); but, the single-shot circuit connected to the $\overline{Q}$ output lead of stage Q8 will provide a 1 μsec. negative (high-to-low) pulse to clear stages Q2 and Q4 so as to make Q2 low and Q4 low. This changes the down-counter to a value of nine (1001), the initial starting point. The down-counter thus functions as a decimal down-counter which goes from zero (0000) to nine (1001) instead of from zero (0000) to 15 (1111).

8421 BCD Up Counter

Figure 24:
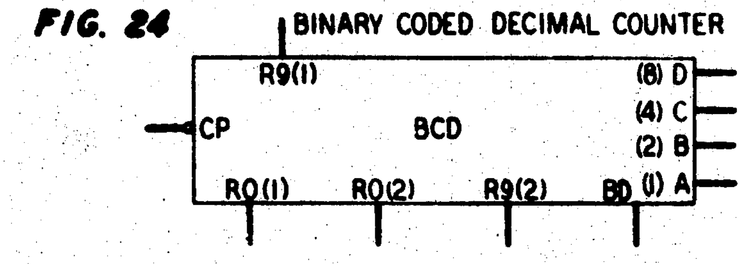

FIG. 24 shows the symbol of a typical decade up-counter such as Texas Instruments integrated circuit SN 7490 and the like. The binary coded decimal weighings of the output leads A, B, C and D are 1, 2, 4 and 8, respectively. Used as a symmetrical divide-by-10 counter, the D output is connected to the CP input, BD is the input, and A is the output. Used as a binary coded decimal counter, BD is connected to A, and CP is the input.

As a BCD counter, if RO(1) and RO(2) are high and at least one of R9(1) and R9(2) is low, the counter is forced into and is held in state zero (0000). If R9(1) and R9(2) are high, the counter is set and is held in state nine (1001). If RO(1) or RO(2) or both are low and R9(1) or R9(2) or both are low, the following table shows the states of the A, B, C and D outputs as the clock pulse input CP (P) receives high-to-low pulses:

| | 1 | 2 | 4 | 8 | |
|---|---|---|---|---|---|
| CP | A | B | C | D | Decimal count |
| P | L | L | L | L | 0 |
| P | H | L | L | L | 1 |
| P | L | H | L | L | 2 |
| P | H | H | L | L | 3 |
| P | L | L | H | L | 4 |
| P | H | L | H | L | 5 |
| P | L | H | H | L | 6 |
| P | H | H | H | L | 7 |
| P | L | L | L | H | 8 |
| P | H | L | L | H | 9 |
| P | L | L | L | L | 0 |
| | | etc. | | | |

Decade Up-Counter

Figure 25:
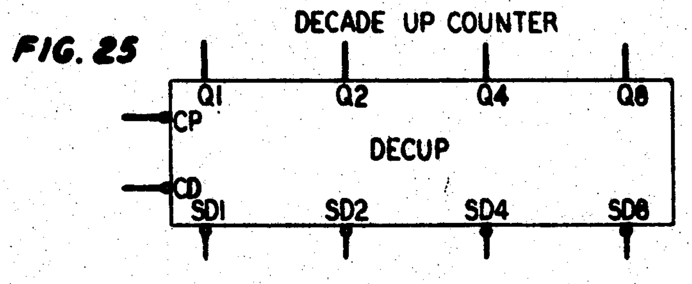

FIG. 25 shows a typical binary-coded decimal up counter such as Motorola integrated circuit MC 838 and the like. With all SD- inputs high and with input CD low, the counter goes to state zero (0000) with Q1, Q2, Q4 and Q8 each low. With the CD input high, any of the SD- inputs being pulsed high-to-low will set the corresponding stage into state "1" with the corresponding Q1, Q2, Q4 or Q8 high. With input CD high and all SD- inputs high, the internal circuitry is arranged so that the counter will progress through 10 decimal counts and repeat as long as the clock pulse lead CP is pulsed (P) negatively (high-to-low). The following table shows the action of the counter:

| | | | 1 | 2 | 4 | 8 | |
|---|---|---|---|---|---|---|---|
| CD | SD | CP | Q1 | Q2 | Q4 | Q8 | Decimal count |
| H | H | P | L | L | L | L | 0 |
| H | H | P | H | L | L | L | 1 |
| H | H | P | L | H | L | L | 2 |
| H | H | P | H | H | L | L | 3 |
| H | H | P | L | L | H | L | 4 |
| H | H | P | H | L | H | L | 5 |
| H | H | P | L | H | H | L | 6 |
| H | H | P | H | H | H | L | 7 |
| H | H | P | L | L | L | H | 8 |
| H | H | P | H | L | L | H | 9 |
| H | H | P | L | L | L | L | 0 (10) |
| H | H | P | H | L | L | L | 1 |
| | | | | etc. | | | |

Four-Bit Binary Counter

Figure 26:
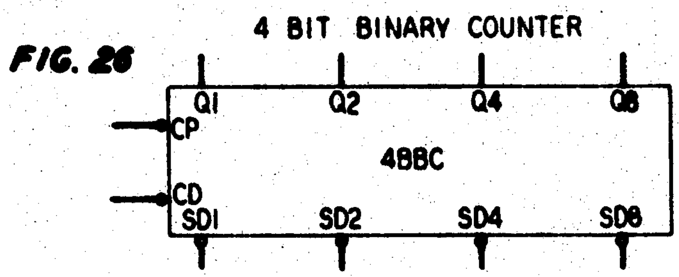

FIG. 26 shows a typical four-bit binary counter such as Motorola integrated circuit MC 839 and the like. This circuit is the same as that of FIG. 25 except that the internal wiring is rearranged to provide a full range of binary counting from zero (0000) to 15 (1111) to zero (0000), etc. instead of covering merely a decimal range of zero (0000) to nine (1001) to zero (0000), etc. as in the counter of FIG. 25.

Signals

Figure 27:
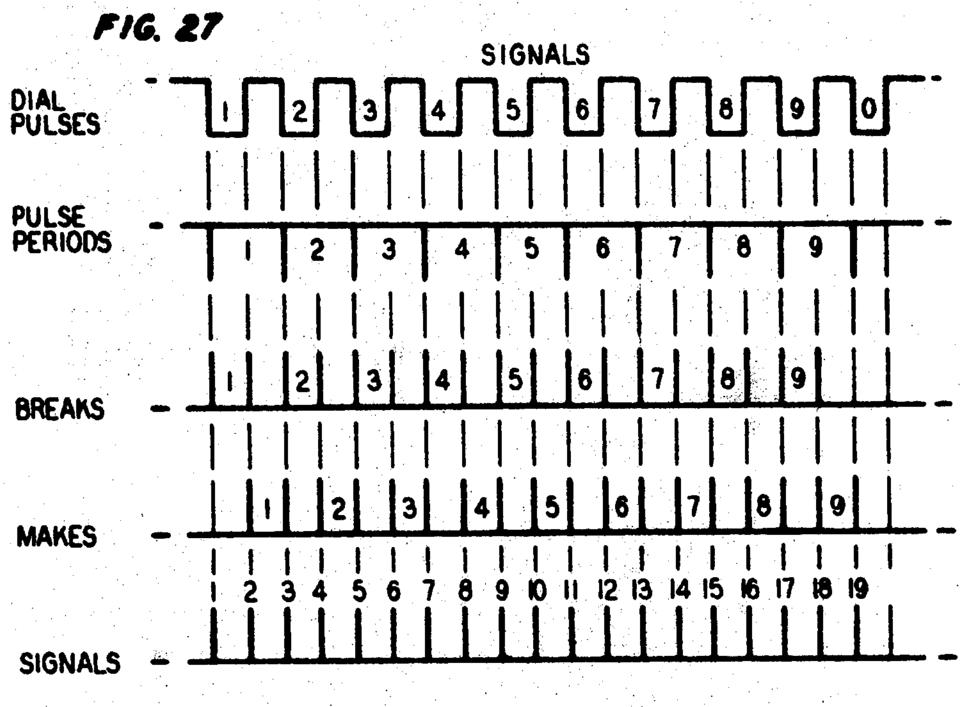
FIG. 27 shows a series of 10 telephone dial pulses and the various signals which can be derived from that series of dial pulses.

FIG. 27 illustrates the various parts of and the signals which can be derived from a series of telephone dial pulses. The top line in FIG. 27 shows the 10 break intervals 1 to 0 (10) produced by a dialing of the digit 10. Of course, as is well known, the lengths of the makes and breaks can vary over quite a range. Percent break for any pulse period is the ratio of the length of the break to the length of the pulse period. Speed is the number of pulse periods occurring in a unit of time, such as a second.

The next-to-the-top line in FIG. 27 shows the 10 signals (spikes) defining the boundaries of the nine full pulse periods of the top line.

The middle line in FIG. 27 shows the 18 signals defining the boundaries of the nine break intervals.

The next-to-the-bottom line in FIG. 27 shows the 18 signals defining the boundaries of the nine make intervals.

The bottom line in FIG. 27 shows the 19 signals defining all of the significant transitions of the nine full pulse periods.

The detailed circuit disclosure to be described hereinafter goes on the assumption that break intervals are high and make intervals are low. It will be apparent to those skilled in the art that the dial pulse input circuitry, such as the box designated DIAL PULSES in the block diagram of FIG. 1, and such as the box designated DIAL PULSE INPUT in FIG. 28, may be arranged to feed to a measuring circuit any desired polarities of signal conditions.

In a measuring circuit, such as disclosed in FIGS. 28 through 33, using clock-controlled digital technique, it would be desirable to arrange the dial pulse input to be synchronized to the clock pulse source in order to minimize small errors which might arise due to an out-of-phase condition. Any desired such synchronizing circuit could be part of the dial pulse input. One such arrangement is the subject matter of an application of R. B. Heick, Ser. No. 849,997, filed on Aug. 14, 1969 and allowed on Dec. 16, 1970 for "Delayed Clock Pulse Synchronizing of Random Input Pulses." While such synchronism may be desirable, it is not necessary since, as will be shown hereinafter, the measuring circuit can function with nonsynchronous dial pulse input and can do so with negligible error.

In FIG. 27 it will be seen that among the odd series of 19 signals there are nine alternate consecutive pairs of signals defining the nine break intervals. The detailed circuitry to be described is arranged to measure the average break interval over the nine pulse periods in terms of a percentage of the average pulse period.

Block Diagram

Figures 1, 34:
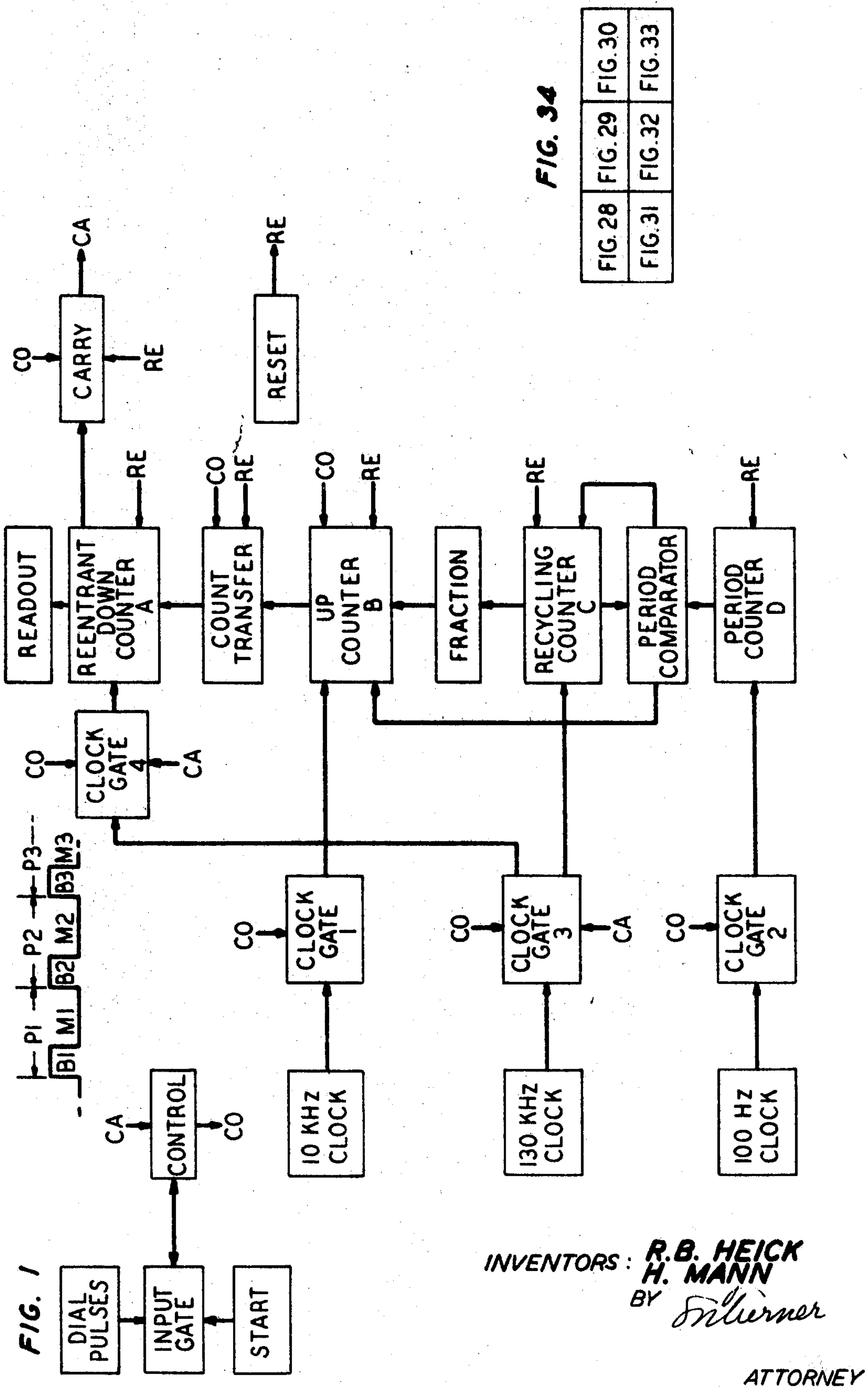
FIG. 1 is a functional block diagram of the detailed circuit disclosure shown in FIGS 28 through 33 arranged as shown in FIG. 34 (same sheet as FIG. 1)

FIG. 1 is a block diagram showing the main functional parts of the detailed circuit disclosure of FIGS. 28 through 33. In the upper part of the diagram is illustrated a train of telephone dial pulses including the first two pulse periods P1 and P2, each made up of a high break interval (B1 and B2) and a low make interval (M1 and M2). Part of the third pulse period P3 is shown; but, it will be understood that as many pulse periods as are desired may be used. The particular embodiment used herein is arranged to measure percent break over the first nine full pulse periods of a train of pulses such as shown in the top line of FIG. 27.

One of the significant characteristics of telephone dial pulsing is the so-called "percent break," which is the percentage of a full pulse period (P1, P2, P3, etc.) occupied by the break interval (B1, B2, B3, etc.). Over a series of pulses (pulse periods) the true average percent break or average duty cycle is the sum of all individual ratios of B to P divided by the number of pulse periods N. An approximate average duty cycle is the ratio of average break interval to average pulse period. The break intervals and pulse periods are "measured" by counting the number of clock pulses occurring within those times. A 100-Hz. clock (100 clock pulses per second) is used to measure pulse periods and a 10-kHz. clock (10,000 clock pulses per second) is used to measure break intervals. 100-Hz. clock pulses are counted for the duration of nine pulse periods and 10-kHz. clock pulses are counted for the sum of the corresponding nine break intervals. Dividing the total 10-kHz. count by the total 100-Hz. count provides a close approximation to average percent break over that number of pulse periods. Assuming a train of nine pulse periods (100 milliseconds each) at a dialing speed of 10 pulses per second (pps) with a break interval of 60 milliseconds (msec.) and a make interval of 40 msec., the 10-kHz. clock count would accumulate for 540 msec. and the 100-Hz. clock count would accumulate for 900 msec. The total 10-kHz. count would be 5,400, and the total 100Hz. count would be 90. Dividing 5,400 by 90 provides an answer of 60.0 percent. If, as occurs in actual practice, the total pulse period should vary slightly over a train of pulses and the break interval should vary slightly from pulse period to pulse period, the sums of the two clock pulse counts would vary from the above values of 5,400 and 90. For instance, the summation of the break intervals might be 5,850 and the summation of the pulse periods might be 92 providing an answer of 63.6 percent or the values might be 5,100 and 88 providing an answer of 57.0 percent, etc.

In the block diagram of FIG. 1, the 100-Hz. clock is up-counted in the Period Counter D for the time of nine pulse periods and the 10-kHz. clock is up-counted in Up-Counter B for the time of nine break intervals. The break count in counter B is then transferred as the same count into Reentrant Down-Counter A (counters A and B having the same count capacity) and counter B is cleared to zero count. Then the 130-kHz. clock is down-counted in counter A while being up-counted in the Recycling Counter C. Each time the Period Comparator detects that the count in counter C equals the count in counter D, one count is placed in the cleared counter B and counter C is recycled to zero count. Each such count in counter B is called a block count—i.e., one full period count of counter D. When counter A down-counts from zero count to capacity count, the accumulated block count will equal the number of full block counts required to dissipatively reduce the count in counter A to zero. The remaining partial block count, if any, in counter C is then taken into account to arrive at a fractional value. The full and fractional block count values are placed into counter B and transferred to counter A which controls the Readout circuit to provide a visual display of the average percent break. Specifically with reference to the block diagram of FIG. 1, when the system is reset (or cleared or normalized) counters A, B, C and D are set to zero count and the carry is set to provide a carry signal on lead CA: also, the input gate is arranged to pass the dial pulse input to the control so that the leading and trailing edges of the break intervals can be used for control purposes. In response to the input dial pulses, the control enables gate 1 to pass 10-kHz. clock pulses to counter B during the nine break intervals and enables gate 2 to pass 100-Hz. clock pulses to period counter D during the nine pulse periods. At the conclusion of the nine pulse periods, the control disables gates 1 and 2, enables the transfer circuit to place in counter A the same count as in counter B, clears counter B to zero count, and enables gates 3 and 4. The 130-kHz. clock source is counted in the recycling counter C while being serially subtracted (down-counted) from the count in counter A. Each time the count in counter C equals the 100-Hz. period count in counter D, one "block count" is inserted into the cleared counter B. When the count in counter A down-counts from zero count to capacity count, the carry circuit causes the control to disable gates 3 and 4, to take into account any partial block count remaining in counter C, and to place in counter B a fractional block count value. When the remainder operation is finished, the control transfers the full and fractional block count in counter B to counter A to permit the readout circuit to decode and display the answer.

The circuit is arranged to measure an approximation of pulsing speed by inserting into counter A a prescribed value such as 9,000, by accumulating 100-Hz. clock pulses in the period counter D for nine pulse periods (900 milliseconds for a pulsing speed of 10 pps), and dividing the 9,000 in counter A by the 90 in counter D to arrive at an answer of 100, which, with the decimal point in the right place, becomes a speed of 10.0 pps.

DETAILED CIRCUIT DESCRIPTION

Before discussing the operation of the detailed circuit disclosure of FIGS. 28 through 33 (see FIG. 34 on same sheet as FIG. 1), certain switches and contacts warrant brief comment.

Figure 28:
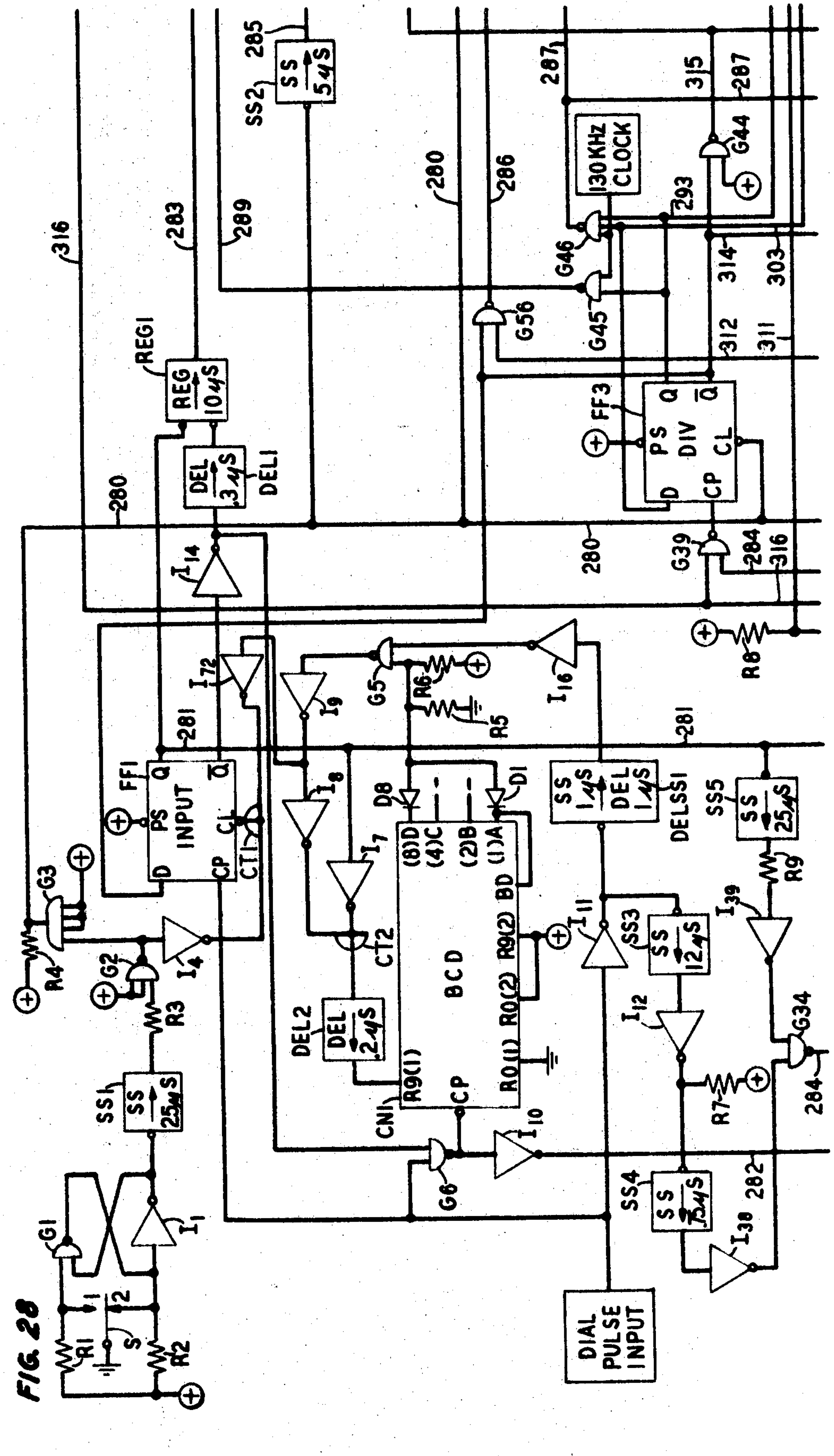

In FIG. 28 (upper left) is shown a switch S with its swinger in contact with its contact 2. The swinger is movable out of contact with contact 2 and into contact with contact 1. Switch S is a locking pushbutton switch: when the button is pushed once from the position shown, the swinger moves away from contact 2 into contact with contact 1 and remains there, contact 2 opening before contact 1 closes; and, when the button is again pushed, the swinger moves away from contact 1 into contact with contact 2, contact 1 opening before contact 2 closes. The position shown in the drawing is the STOP/READ position (contact 2 closed and contact 1 open): the other position is the CLEAR/START position (contact 1 closed and contact 2 open).

Figure 30:
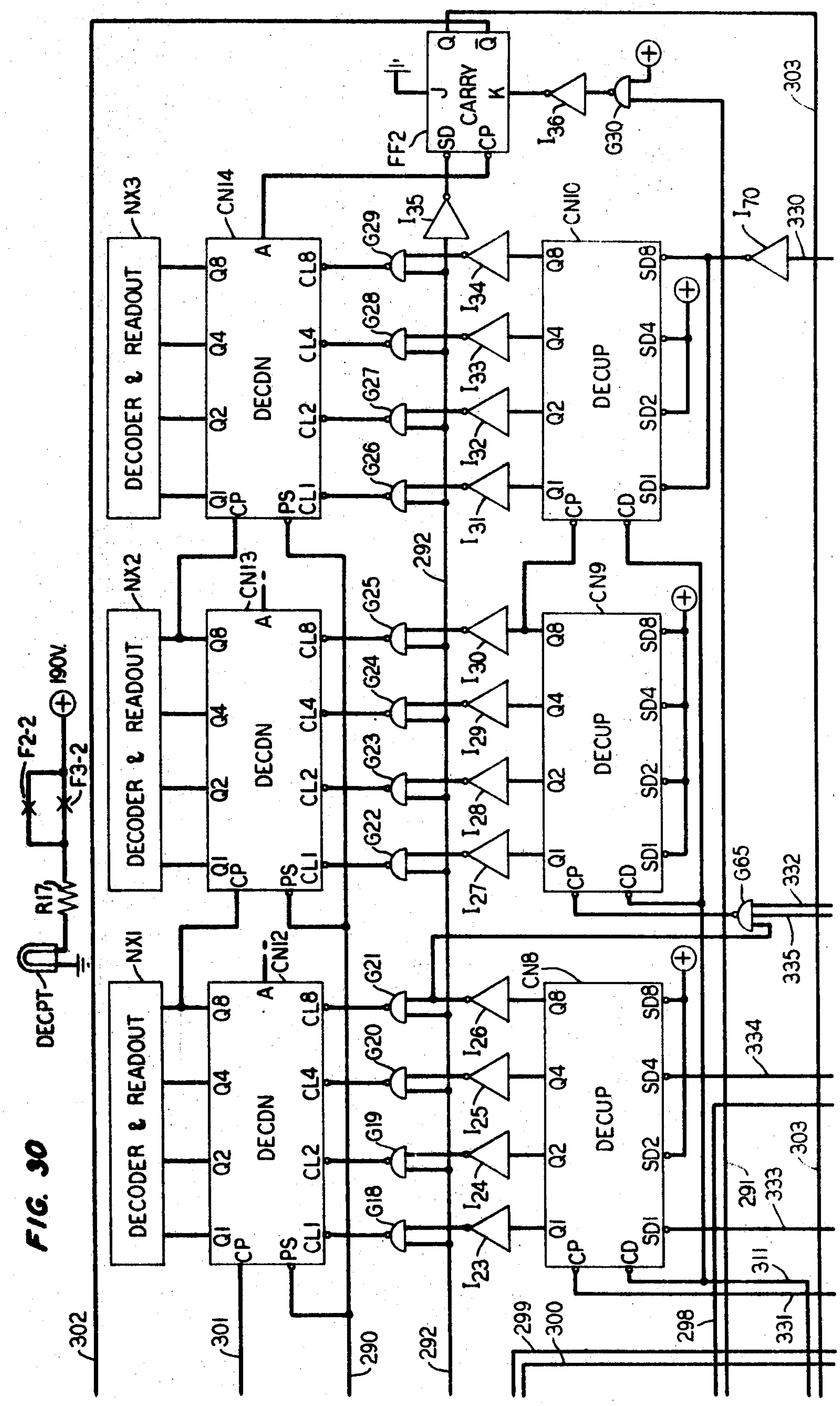
Figure 31:
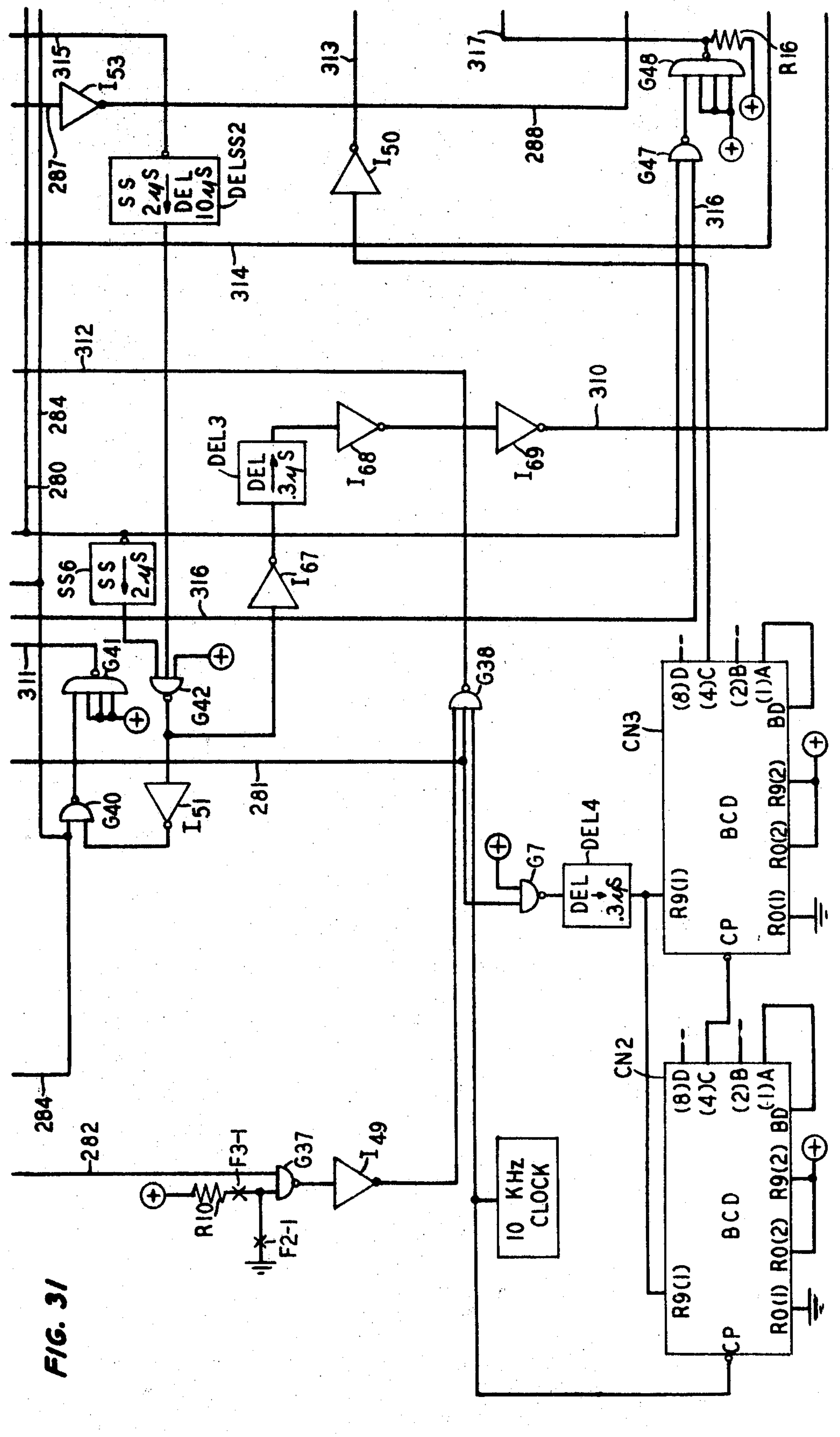
Figure 33:
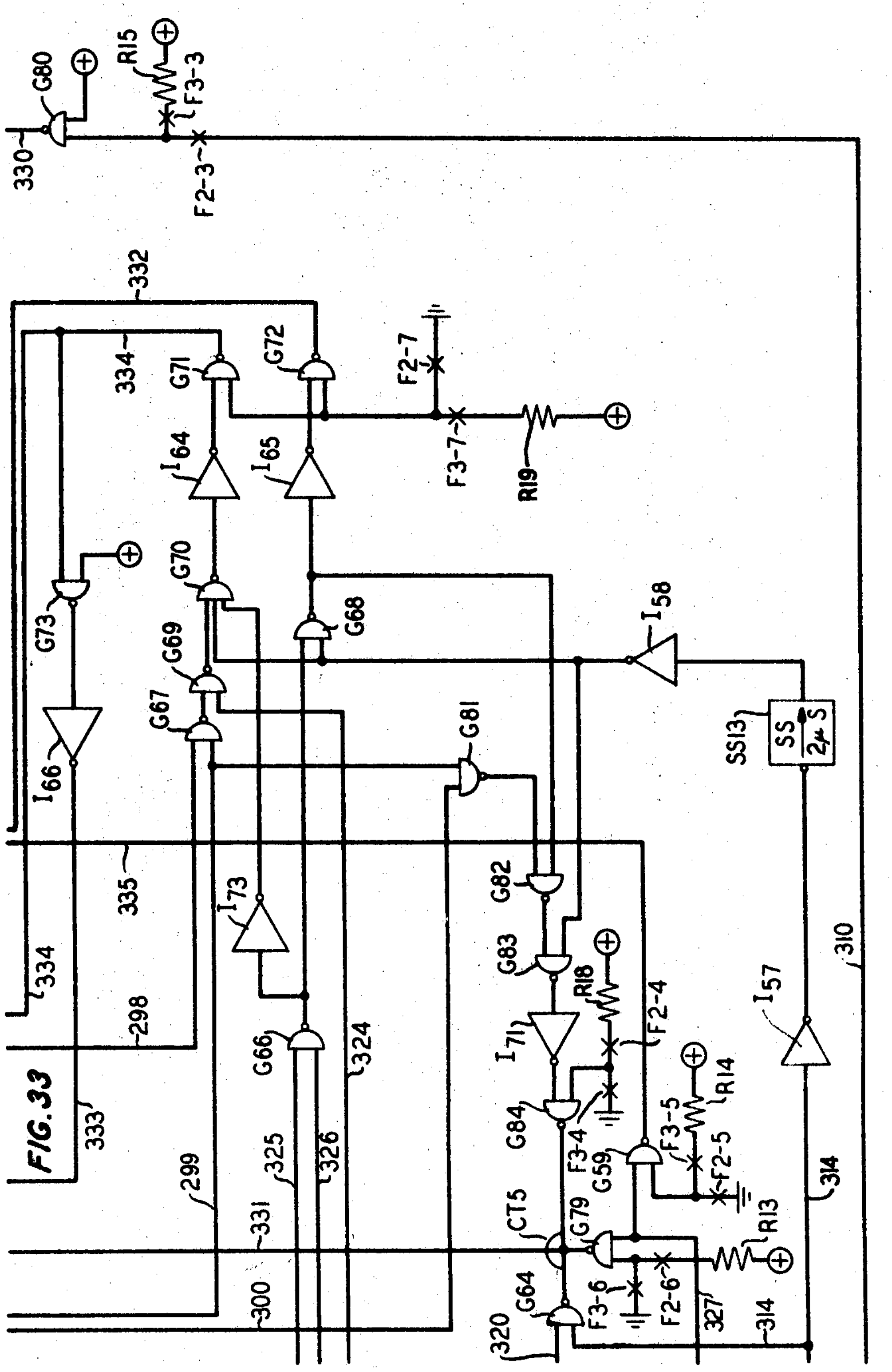

In FIGS. 30, 31 and 33 are shown seven make contacts F2-1 through F2-7 and seven make contacts F3-1 through F3-7. The F2- contacts are closed when the F2 switch is operated to prepare the circuit for measuring pulsing speed (PPS). The F3- contacts are closed when the F3 switch is operated to prepare the circuit for measuring percent break (% BK). Only one of the F2 and F3 switches is operated at one time. Obviously, when the F2 or F3 switch is not operated, the corresponding contacts are open.

Start Conditions

It is assumed that the % BK switch F3 is operated (and the speed switch F2 is released) so that in the circuit of FIGS. 28 through 33 contacts F3-1 through F3-7 are closed (and contacts F2-1 through F2-7 are open) to arrange the circuit for measuring % BK.

Also, it is assumed that the output in FIG. 28 of the DIAL PULSE INPUT is a steady low (make) to signify that no pulsing is being fed to the circuit.

Also, it is assumed that the switch S in the upper left of FIG. 28 is contacting its lower contact 2 (as shown) in its so-called STOP/READ position.

With the above conditions prevailing, the condition of the circuit is not known except for the following:

1. the decimal point lamp DECPT of FIG. 30 is lit (physically located between readout circuits NX1 and NX2); and, 2. in FIG. 30, the readout circuits NX3, NX2 and NX1, in that order are displaying whatever is in the upper register (counters CN14, CN13 and CN12).

Figure 29:
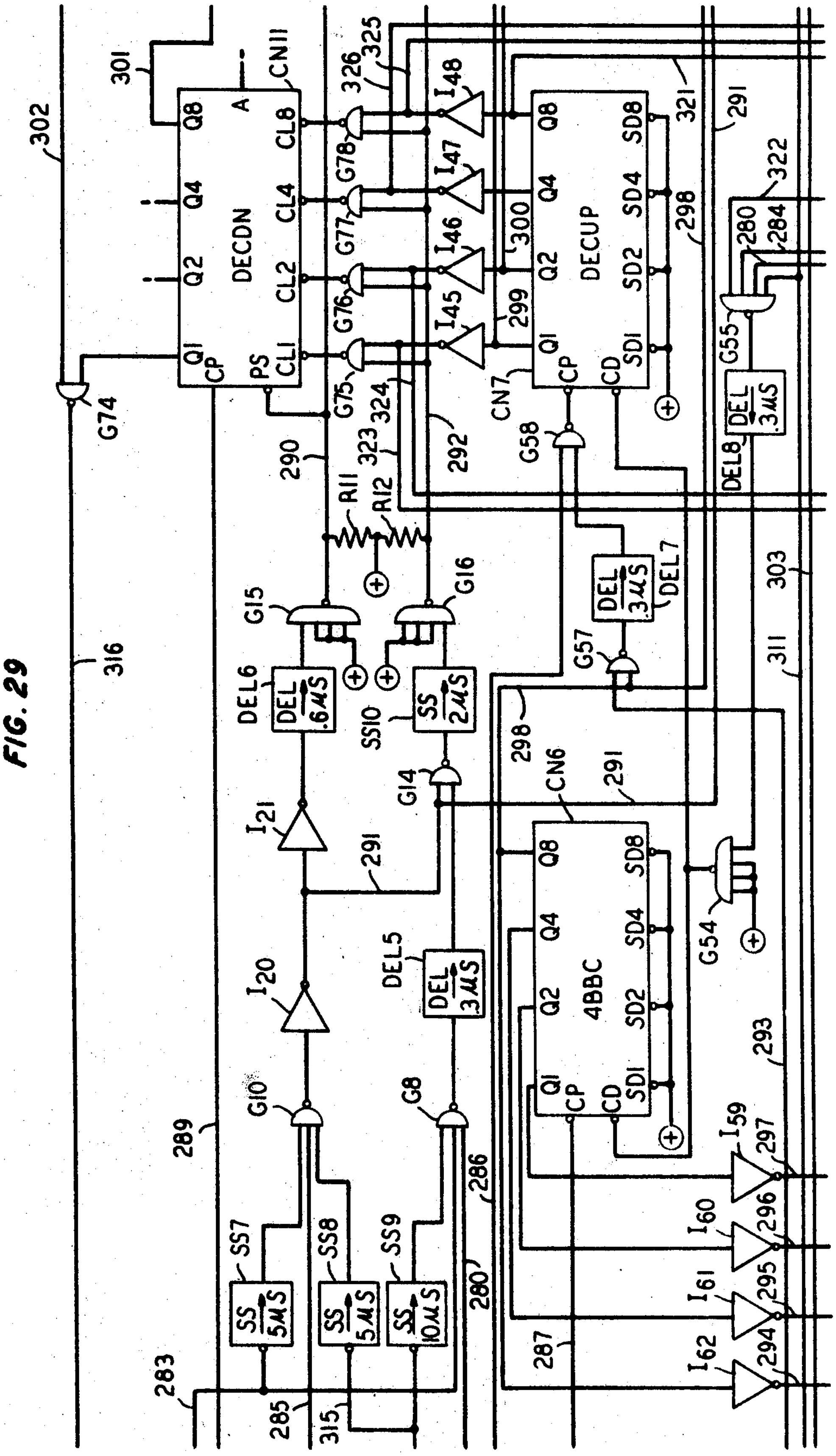

In FIG. 28, the input to I1 is held low from contact 2 of switch S and the upper input to G1 is held high through resistance R1 to correspond to the high output of I1, with the low output of G1 corresponding to the low input to I1. The input and output of single shot SS1 are high, the SS1 high output being effective through G2 as a low input to I4 and to the left input to G3. The output of I4 is thus high at the left input to collector tie CT1. Since the right three inputs to G3 are permanently high, the output of G3 is high on lead 280 extending into FIGS. 29, 31 and 32. In FIG. 29, the high on lead 280 renders high the lower input to G8. In FIG. 28, the high on lead 280 renders high the CL input to the division flip-flop FF3. In FIG. 31, the high on lead 280 renders high the upper input to G47. Also, in the lower right of FIG. 29, the high on lead 280 extends to the next-to-lower input to G55.

In FIG. 28, the low make output from the DIAL PULSE INPUT extends to the CP input to FF1, to the left input of G6, and to the input to I11. The output of I11 is high at the input to delayed single shot DELSS1, whose output is high at the input to I16. The low output of I16 is effective through G5 as a high at the input to I9 and is effective through I9 and I72 as a high at the right input to collector tie CT1. The output of collector tie CT1 is thus high at the CL input to FF1. In FIG. 28, the low output of I9 is effective through I8 to hold high the upper input to collector tie CT2. The low output of the DIAL PULSE INPUT in FIG. 28 is effective through G6 as a high at the CP input to counter CN1 and through I10, lead 282 into FIG. 31, and through G37 and I49 as a low at the upper input to G38. The resulting high output from G38 extends over lead 312 into FIG. 28 to the lower input to G56.

The status of other circuit components is not definable at this time; however, certain high or low logic levels exist at certain points in the circuit, as will be described presently. In FIG. 28, output of REG1 is high on lead 283 into FIG. 29 at the input to SS7 and at the middle input to G8. In FIG. 28, the output of SS2 is high on lead 285 into FIG. 29 at the middle input to G10. In FIG. 29, the outputs of SS7, SS8 and SS9 are high at the respective upper input to G10, the lower input to G10, and the upper input to G8. Since all of the inputs to G8 and G10 are high, the outputs of G8 and G10 will be low. The low output of G10 is effective as a high output from I20 on lead 291; and, the low output of G8 is effective through DEL5 as a low at the lower input to G14. The high on lead 291 in FIG. 29 is effective through I21, DEL6 and G15 as a high on lead 290 in FIGS. 29 and 30 at the PS inputs to counters CN11, CN12, CN13 and CN14. Also, the high on lead 291 in FIG. 29 is effective through G14 as a high at the input to SS10, whose high output is effective through G16 as a low on the transfer lead 292 in FIGS. 29 and 30. The low on lead 292 at the left inputs to the transfer gates G75 through G78 of FIG. 29 and G18 through G29 of FIG. 30 holds high the outputs of these transfer gates at the CL1, CL2, CL4 and CL8 inputs to counters CN11 through CN14. Also, in FIG. 30, the low on the transfer lead 292 is effective through I35 as a high at the SD input to the carry flip-flop FF2. The high on lead 291 in FIG. 29 extends over lead 291 into FIG. 30, where it is effective through G30 and I36 as a high at the K input to FF2. In FIG. 30, any steady condition of counter CN14 provides a low on its A output at the CP input to FF2.

Whatever happens to be the condition in FIG. 30 of counters CN12, CN13 and CN14 will be decoded by the decoder and readout circuits NX1, NX2 and NX3 and displayed as three lighted decimal numerals. The decimal point lamp DECPT is lit (and physically located between NX1 and NX2) in an obvious circuit over contact F3-2; and, the readouts NX3, NX2 and NX1 will show respective tens, units and tenths visual indications.

In FIG. 28, the high output of single shot SS3 is effective as a low output from I12 at the input to SS4 and the high output of SS4 is effective as a low output from I38 at the left input to G34. The high output from SS5 is effective through I39 as a low at the right input to G34. G34, with its two inputs low, produces a high output on lead 284 into FIG. 31 at the upper input to G40. The high on lead 284 extends into FIG. 28 to the lower input to G39 and extends from FIG. 31 through FIG. 32 into FIG. 29 to the next-to-upper input to G55. In FIG. 31, the upper two inputs to G42 are held high from single shot SS6 and delayed single shot DELSS2: the resulting low output from G42 is effective through I51 to hold high the lower input to G40. With both of its inputs high in FIG. 31, G40 provides a low output, which is effective through G41 as a high on lead 311, through FIG. 28 and into FIGS. 29 and 30. In FIG. 29, the high on lead 311 extends to the lower input to G55; and in FIG. 30, the high on lead 311 extends to the CD inputs of counters CN8, CN9 and CN10.

Figure 32:
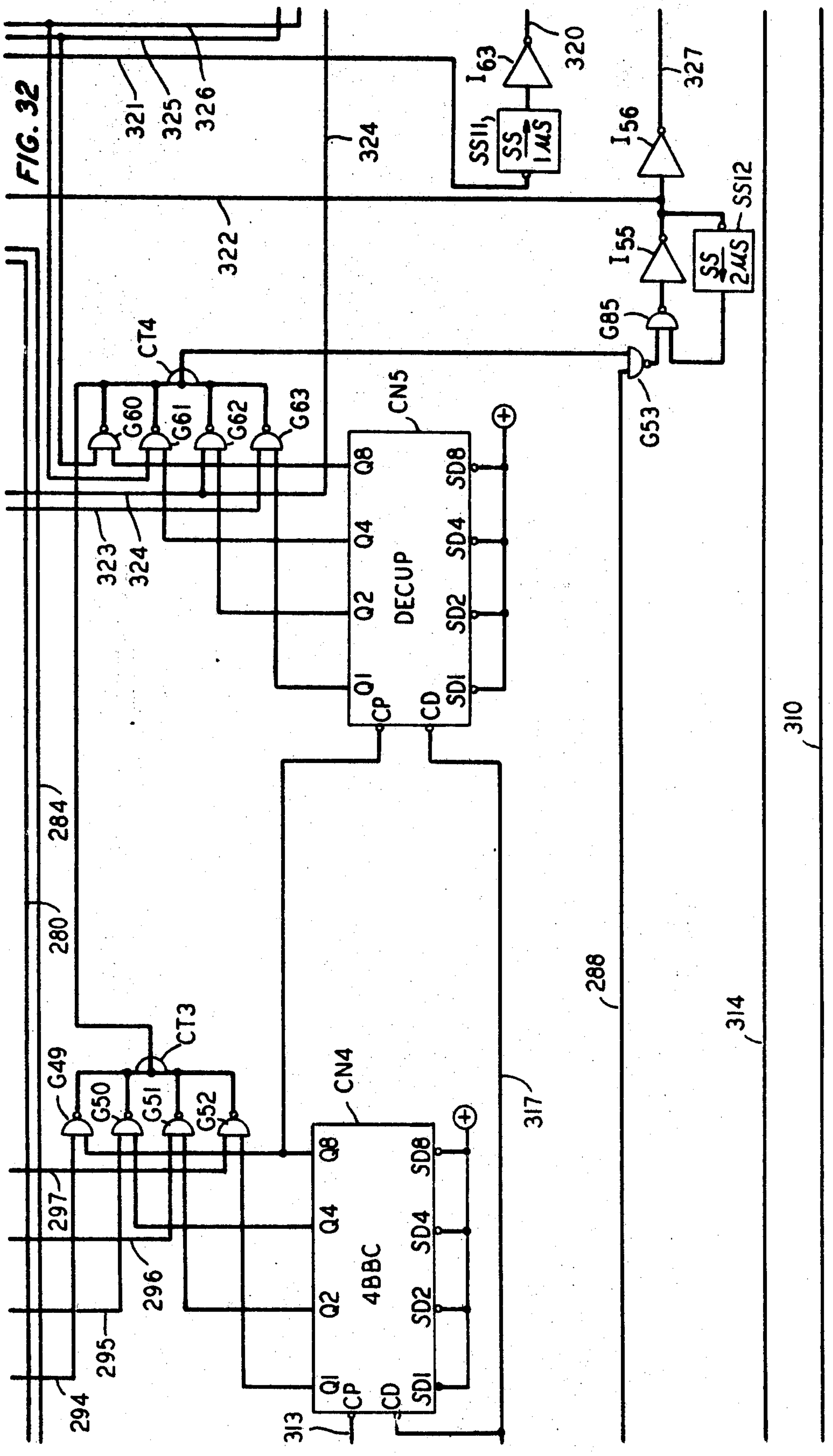

In FIG. 33, the high output of SS13 is effective through I58 as a low at the lower input to G83, at the lower input to G68, and at the middle input to G70, thus causing the outputs of G83, G68 and G70 to be high. The high output from G83 is effective through I71 as a low at the upper input to G84: since the lower input to G84 is held low through contact F3-4, G84 provides a high output at the right input to collector tie CT5. The left input to G79 is held low through contact F3-6, thus rendering the output of G79 high at the middle input to CT5. In FIG. 32, the high output of SS11 is effective through I63 as a low on lead 320 into FIG. 33 at the upper input to G64: the resulting high output of G64 renders high the left input to CT5. With all three inputs to CT5 high, the output of CT5 is high on lead 331 into FIG. 30 at the CP input to counter CN8. In FIG. 33, the high output of G68 extends to the lower input to G82 and is effective through I65 as a low at the upper input to G72, whose resulting high output (lower input high through contact F3-7) extends over lead 332 into FIG. 30 to the right input to G65. In FIG. 33, the high output from G70 is effective through I64 as a low at the upper input to G71, whose resulting high output (lower input high through contact F3-7) on lead 334 extends into FIG. 30 to the SD4 input to counter CN8. The high on lead 334 in FIG. 33 is also effective through G73 and I66 as a high on lead 333 into FIG. 30 to the SD1 input to counter CN8.

In FIG. 33, the high at the left input to G80 through contact F3-3 is effective through G80 as a low on lead 330 into FIG. 30 and through I70 as a high at the SD1 and SD8 inputs to counter CN10. Also, in FIG. 33, the lower input to G59 is held high over contact F3-5; and, in FIG. 32, the high output of SS12 holds high the lower input to G85.

Clearing the System

With the above-described start conditions prevailing, the circuit is cleared (normalized, initialized, etc.) by the manual operation in FIG. 28 of switch S from its STOP/READ position (as shown, contact 2 closed and contact 1 open) to its CLEAR/START position (contact 1 closed and contact 2 open). When this occurs, as will be described in detail below, single shot SS1 in FIG. 28 produces at its output a 25-μsec. low pulse for accomplishing the following results:

1. the input flip-flop FF1 of FIG. 28 is cleared (Q low—$\overline{Q}$ high);
2. the division flip-flop FF3 of FIG. 28 is cleared (Q low —$\overline{Q}$ high);
3. in FIGS. 28 and 31, each of counters CN1, CN2 and CN3 is set to a count of nine (A and D outputs high—B and C outputs low);
4. in FIGS. 29 and 32, each of counters CN4, CN5 and CN6 is cleared to zero count (all outputs Q1, Q2, Q4 and Q8 low);
5. in FIGS. 29 and 30, each counter CN7, CN8, CN9 and CN10 of the lower register is cleared to zero count (all Q1, Q2, Q4 and Q8 outputs low);
6. in FIGS. 29 and 30, each counter CN11, CN12, CN13 and CN14 of the upper register is preset to its maximum count of 15 (all Q1, Q2, Q4 and Q8 outputs high);
7. in FIGS. 29 and 30, the zero count in the lower register (counters CN7, CN8, CN9 and CN10) is transferred as zero count into the upper register (counters CN11, CN12, CN13 and CN14); and,
8. the carry flip-flop FF2 of FIG. 30 is set to its one state (Q high—$\overline{Q}$ low).

When switch S of FIG. 28 is operated to its upper position (contact 1 closed—contact 2 open), the upper input to G1 is made low over contact 1 of switch S and the input to I1 is made high through resistance R2: the output of G1 goes high, corresponding to the high input to I1, whose output goes low at the input to a single shot SS1. G1 and I1 comprise, in effect, a flip-flop circuit which disregards chatter at contact 1 of switch S since any variation at contact 1 cannot affect the output of I1 provided contact 2 of switch S remains high. In response to the high-to-low transition at its input, SS1 produces a 25-μsec. low output pulse, which is effective through G2 as a 25-μsec. high pulse at the left input to G3 and at the input to I4. The 25-μsec. low output of I4 at the left input to CT1 makes low the output of CT1 at the CL input to FF1 for at least 25 μsec. The low at the CL input to FF1, whose PS input is permanently high, clears FF1 to its zero state (Q low—$\overline{Q}$ high). The output of G3 produces on lead 280 (into FIGS. 28, 29, 31 and 32) a 25-μsec. low pulse.

The low Q output of FF1 on lead 281 in FIG. 28 extends into FIG. 31 to the middle input to G38 and to the left input to G7. The high output from G7 is effective through DEL4 to hold high the R9(1) inputs to counters CN2 and CN3, thus to set each counter CN2 and CN3 to a count of nine (C output low). The low C output from CN3 is effective through I50 as a high on lead 313 into FIG. 32 at the CP input to counter CN4.

The low Q output in FIG. 28 of FF1 is also effective through I7 to render high the right input to collector tie CT2, whose high output is effective through DEL2 to hold high the R9(1) input to counter CN1, which thereupon is set to a count of nine (A and D outputs high—B and C outputs low): the high A and D outputs of CN1 render high the left input to G5.

The 25-μsec. low pulse on lead 280 in FIG. 28 extends to the CL input to the division flip-flop FF3 (PS input permanently high) to clear FF3 (Q low—$\overline{Q}$ high). The high $\overline{Q}$ output of FF3 extends to the D input to the input flip-flop FF1 and to the upper input to G56, whose resulting low output on lead 286 extends into FIG. 29 to the upper input to G58 to become effective from G58 as a high at the CP input to counter CN7. The low Q output of FF3 in FIG. 28 on lead 293 extends to the left input to G45, to the right input to G46, and over lead 293 into FIG. 29 to the upper input to G57. In FIG. 28, the high output from G45 on lead 289 extends into FIG. 29 to the CP input to counter CN11. In FIG. 28, the high output of G46 on lead 287 extends into FIG. 29 to the CP input to counter CN6 and extends from FIG. 28 into FIG. 31 on lead 287 to I53, the low output from which extends on lead 288 into FIG. 32 to the left input to G53. In FIG. 29, the high output from G57 is effective through DEL7 as a high at the lower input to G58. In FIG. 32, the high output of G53 is effective through G85 and I55 as a high on lead 322 into FIG. 29 at the upper input to G55. In FIG. 32, the high on lead 322 is effective through I56 as a low on lead 327 into FIG. 33 at the right input to G79 and at the upper input to G59. In FIG. 33, the high output from G59 extends over lead 335 into FIG. 30 to the middle input to G65.

The 25-μsec. low pulse in FIG. 28 on lead 280 causes SS2 to produce a 5-μsec. low pulse on lead 285 into FIG. 29, at the middle input to G10, which produces a 5-μsec. low output from I20 on lead 291. In FIG. 29, the 5-μsec. low on lead 291 extends to the upper input to G14 to hold the output of G14 high for at least 5 μsec. The 5-μsec. low on lead 291 extends into FIG. 30 and is effective through G30 and I36 to hold low for 5 μsec. the K input to FF2, which thus cannot change state for at least 5 μsec.

The 25-μsec. low on lead 280 in FIG. 29 is effective through G8 and DEL5 to hold the lower input to G14 low for 0.3 μsec. (the delay in DEL5) and then to allow the lower input to G14 to go high for at least 24.7 μsec. (the rest of the 25-μsec. high output from G8). The output of G14 will thus remain high until the end of the 5-μsec. low at its upper input on lead 291.

In FIG. 29, the 25-μsec. low pulse at the next-to-lower input to G55 causes G55 to produce a high output pulse lasting for at least 25 μsec. The low-to-high transition at the output of G55 is delayed for 0.3 μsec. in DEL8, which thereafter is effective through G54 to apply a 24.7-μsec. low pulse at the CD inputs to counters CN6 and CN7. Since the SD—inputs to counters CN6 and CN7 are permanently high, the 24.7-μsec. low pulse at their CD inputs will set them to counts of zero (outputs Q1, Q2, Q4 and Q8 low).

In FIG. 31, the 25-μsec. low pulse on lead 280 is effective through G47 and G48 as a 25-μsec. low pulse on lead 317 into FIG. 32 at the CD inputs to counters CN4 and CN5, which are thereupon set to counts of zero (outputs Q1, Q2 Q4 and Q8 low) since their SD—inputs are permanently high. As soon as counter CN4 (FIG. 32) is set to zero count (at the leading edge of the 25-μsec. clearing pulse), the lows on its Q1, Q2, Q4 and Q8 outputs are effective through gates G49, G50, G51 and G52 to render all inputs to collector tie CT3 high so as to make the output of CT3 high at one of the inputs to collector tie CT4. The low Q8 output of CN4 renders low the CP input to CN5. Likewise, in FIG. 32, the low Q1, Q2, Q4 and Q8 outputs of the cleared counter CN5 (set to zero count) are effective through gates G60, G61, G62 and G63 to render high the other four inputs to collector tie CT4, whose high output appears at the right input to G53.

As soon as counter CN6 in FIG. 29 is set to zero count (0.3 μsec. after the leading edge of the 25-μsec. clearing pulse), the low Q1, Q2, Q4 and Q8 outputs of CN6 are effective through I59, I60, I61 and I62 as highs on leads 297, 296, 295 and 294 into FIG. 32 at the upper inputs to gates G52, G51, G50 and G49. The low Q8 output in FIG. 29 of CN6 appears on lead 298 at the lower input to G57 and extends over lead 298 through FIGS. 29 and 30 into FIG. 33 to the upper input to G67. The output of G67 is thus high at the upper input to G69.

As soon as counter CN7 in FIG. 29 is set to zero count (0.3 μsec. after the leading edge of the 25-μsec. clearing pulse), the low Q1, Q2, Q4 and Q8 outputs from CN7 are effective as highs from I45, I46, I47 and I48, over leads 323, 324, 326 and 325 into FIG. 32 at the upper inputs to gates G63, G62, G61 and G60. The highs on leads 324, 325 and 326 in FIG. 32 extend into FIG. 33 respectively to the lower input to G69, to the upper input to G66 and to the lower input to G66. The output of G66 is FIG. 33 is thus low at the upper input to G68 and at the input to I73. The low output from G69 in FIG. 33 extends to the upper input to G70 and the high output from I73 extends to the lower input to G70. In FIG. 29, the low Q8 output from CN7 extends over lead 321 into FIG. 32 to the input to SS11. In FIG. 29, the low Q1 and Q2 outputs of CN7 extend over leads 299 and 300, through FIG. 30 and into FIG. 33, where the low on lead 299 extends to the lower input to G67 and to the right input to G81, and where the low on lead 300 extends to the left input to G81. In FIG. 33, the high output of G81 extends to the upper input to G82 and the high output of G68 extends to the lower input to G82: the resulting low output of G82 extends to the upper input to G83.

In the meantime, the 25-μsec. low pulse on lead 280 in FIG. 31 causes SS6 to produce a 2-μsec. low pulse at the upper input to G42, which pulse is effective through G42, I51, G40 and G41 to produce a 2-μsec. low pulse on lead 311 extending through FIGS. 31, 28 and 29 into FIG. 30 to the CD inputs to counters CN8, CN9 and CN10. Since the SD—inputs to counters CN8, CN9 and CN10 are high, the 2-μsec. low pulse at their CD inputs clears these counters to zero counts (outputs Q1, Q2, Q4 and Q8 are low). The low Q8 output of CN8 is effective through I26 and G65 to make the CP input to CN9 low: the low Q8 output of CN9 renders low the CP input to CN10.

In FIG. 29, the leading edge of the 5-μsec. high pulse from I21 is delayed 0.6 μsec. in DEL6, whose outputs is then effective through G15 to apply a 4.4-μsec. low pulse to lead 290 in FIGS. 29 and 30 at the PS inputs to counters CN11, CN12, CN13 and CN14. Since the output in FIG. 29 of G16 is held low (at least until the end of the 5-μsec. low output from I20) on lead 292 in FIGS. 29 and 30, the outputs of G75, G76, G77 and G78 in FIG. 29 and G18 through G29 of FIG. 30 are held high at the CL1, CL2, CL3 and CL4 inputs to counters CN11, CN12, CN13 and CN14. Under these circumstances, the 4.4-μsec. low pulse on lead 290 at the PS inputs to these counters in FIGS. 29 and 30 sets each of the counters CN11, CN12, CN13 and CN14 to its maximum count of 15 (all Q1, Q2, Q4 and Q8 outputs high).

The high Q8 output of CN11 in FIG. 29 extends over lead 301 into FIG. 30 to the CP input to CN12; the high Q8 output of CN12 extends to the CP input to CN13; and, the high Q8 output of CN13 extends to the CP input to CN14. The A output of CN14 may or may not (depending upon its previous state) produce a 1-μsec. high pulse at the CP input to FF2; but, FF2 cannot be effected by such a pulse since its J and K leads are both low. The high Q1 output from CN11 in FIG. 29 extends to the lower input to G74.

In FIG. 31, at the end of the 2-μsec. low pulse from SS6, the output of SS6 returns to high, the output of G42 returns to low, the output of I51 returns to high, the output of G40 returns to low, and the output of G41 on lead 311 returns to high: in FIGS. 29 and 30, the lead 311 returns to high, thus returning to high in FIG. 30 the CD inputs to CN8, CN9 and CN10 and in FIG. 29 the lower input to G55.

In FIG. 28, at the end of 5 μsec. the output of SS2 returns to high on lead 285 into FIG. 29 at the middle input to G10, thus returning the output of I20 to high on lead 291. The high on lead 291 is effective at once through I21, DEL6 and G15 to return to high the lead 290 in FIGS. 29 and 30 at the PS inputs to counters CN11, CN12, CN13 and CN14. In FIG. 29, the return to high on lead 291 at the upper input to G14 produces a high-to-low transition at the output of G14 for the remainder of the 25-μsec. high clearing pulse at its lower input; and, the high on lead 291 extends into FIG. 30, where it is effective through G30 and I36 to return to high the K input to FF2. In FIG. 29, the high-to-low transition at the output of G14, causes SS10 to produce a 2-μsec. low output pulse, effective through G16 as a 2-μsec. high on the transfer lead 292 in FIGS. 29 and 30.

In FIG. 30, the 2-μsec. high pulse on lead 292 is effective through I35 as a 2-μsec. low pulse at the SD input to FF2, which thereupon becomes set with its Q output high and its $\overline{Q}$ output low. The high Q output of FF2 extends over lead 303 into FIG. 28 to the middle input to G46 and to the D input to FF3. The low $\overline{Q}$ output of FF2 extends over lead 302 into FIG. 29 to the upper input to G74, whose resulting high output extends over lead 316 into FIGS. 28 and 31 to the upper input in FIG. 28 of G39 and to the lower input in FIG. 31 of G47. In FIG. 28, the low output from G39 renders low the CP input to the cleared (Q low—$\overline{Q}$ high) FF3.

In FIGS. 29 and 30 the 2-μsec. high on the transfer lead 292 renders high the left inputs of each of the transfer gates G75 through G78 of FIG. 29 and G18 through G29 of FIG. 30. The low Q1, Q2, Q4 and Q8 outputs of the counters CN7, CN8, CN9 and CN10 (all set to zero count, above) are effective through I45 through I48 of FIG. 29 and I23 through I34 of FIG. 30 as highs at the right inputs to the transfer gates. The outputs of the transfer gates render low all of the CL1, CL2, CL4 and CL8 inputs to counters CN11, CN12, CN13 and CN14. With the PS inputs high to counters CN11 through CN14 of FIGS. 29 and 30, and with all of the cells of these counters in their one states, all of the cells of each counter will be cleared to their zero states, to set each of these counters to zero count (Q1, Q2, Q4 and Q8 outputs low) to correspond to the zero count in counters CN7 through CN10 of FIGS. 29 and 30. The low Q8 output of CN11 in FIG. 29 extends over lead 301 into FIG. 30 to the CP input to CN12; the low Q1 output of CN11 renders low the left input to G74; the low Q8 output of CN12 extends to the CP input to CN13; and, the low Q8 output of CN13 extends to the CP input to CN14. The high output in FIG. 29 of G74 extends over lead 316 into FIG. 28 to the upper input to G39, whose output thereupon goes low at the CP input to FF3. The high on lead 316 also extends into FIG. 31 to the lower input to G47.

At the end of the -μsec. low pulse from SS10 in FIG. 29, the output of SS10 returns to high and the output of G16 returns to low on lead 292 in FIG. 29 and 30. The return to low of lead 292 in FIG. 29 and 30 disables the transfer gates G75 through G78 and G18 through G29 to return to high all of the CL-inputs in FIGS. 29 and 30 to counters CN11 through CN14. Also, in FIG. 30, the return to low on lead 292 returns to high the SD input to FF2.

The circuit remains in the above conditions until the end of the 25-μsec. low clearing pulse from SS1 in FIG. 28. At that time the output of SS1 returns to high, the output of G2 returns to low, the output of I4 returns to high at the left input to CT1, the output of CT1 returns to high at the CL input to FF1, and the output of G3 returns to high on lead 280 in FIGS. 28, 29, 31 and 32. In FIG. 29, the return to high on lead 280 is effective through G8 and DEL5 to at once return to low the lower input to G14, whose output thereupon returns to high at the input to SS10. In FIG. 28, the return to high on lead 280 returns to high the CL input to FF3. In the bottom right of FIG. 29, the return to high on lead 280 is effective at one through G55, DEL8 and G54 to return to high the CD inputs to counters CN6 and CN7. In the bottom right of FIG. 31, the return to high on lead 280 is effective through G47 and G48 to return to high lead 317 extending into FIG. 32 to the CD inputs to counters CN4 and CN5.

In FIG. 31, a circuit extends from the output of G42, through I67, DEL3, I68 and I69, thence over lead 310, through FIG. 32 and into FIG. 33, thence to the contact F2-3. Since contact F2-3 is open at the moment F3—3 is closed for the % BK measurement), this circuit is of no significance.

The circuit remains in the above condition waiting for the first low-to-high transition in FIG. 28 from the output of the DIAL PULSE INPUT, which low-to-high transition will signify the first make-to-break transition of the dial pulse input. The following summarizes the condition of various parts of the circuit as a result of the 25-μsec. clearing pulse from SS1 in FIG. 28, and assuming the DIAL PULSE INPUT to be still supplying a steady low (make) signal:

1. the input flip-flop FF1 of FIG. 28 is cleared (Q low —$\overline{Q}$ high) with its D input high and its CP input low;

2. the division flip-flop FF3 of FIG. 28 is cleared (Q low—$\overline{Q}$ high) with its D input high and its CP input low;

3. in FIG. 28, counter CN1 is set to a count of nine (A and D outputs high—B and C outputs low) with its R9(1) input high and its CP input high;

4. each of the counters CN2 and CN3 of FIG. 31 is set at a counter of nine (C outputs low) with its R9(1) input high, with the CP input low to counter CN3, and with the CP input to counter CN2 connected to the 10-kHz. clock;

5. in FIG. 32, each of the counters CN4 and CN5 is set to zero count (outputs Q1, Q2, Q4 and Q8 low) with all of its SD-inputs high, with its CD input high, with the CP input to CN5 low, and with the CP input to CN4 high;

6. in FIG. 29, counter CN6 is set to zero count (Q1, Q2, Q4 and Q8 low) with its SD-inputs high, with its CD input high, and with its CP input high; and, 7. in FIG. 30, the carry flip-flop FF2 is set (Q high—$\overline{Q}$ low) with its K input high, its CP input low and its SD input high.

The condition of the upper and lower registers of FIGS. 29 and 30 is as follows:

1. each of the counters CN11, CN12, CN13 and CN14 of the upper register is set to zero count (Q1, Q2, Q4 and Q8 outputs low) with its CL-inputs high, with its PS input high, with the CP input to CN11 high, with the CP inputs low to CN12 and CN13 and CN14, and with the A output of CN14 low; and, 2. each of the counters CN7, CN8, CN9 and CN10 of the lower register is set to a count of zero (Q1, Q2, Q4 and Q8 outputs low) with its SD- inputs high, with its CD input high, with the CP inputs high to CN7 and CN8, and with the CP inputs low to CN9 and CN10.

In FIG. 28, the 130-kHz. clock (supplying, for example, lows and highs in the order of 3.8 to 4.0 $\mu$sec. duration) is connected to the left input gate G46 and to the right input to gate G45, both of which are disabled (steady high outputs) by the low Q output of FF3.

In FIG. 31, the 10-kHz. clock (supplying for example, lows and highs of 50 $\mu$sec. duration) is connected to the lower input to G38 and to the CP input to counter CN2. Counter CN2 remains set at the count of nine (C output low) due to the high on its R9(1) input. Gate G38 is disabled by the low on its upper input from I49 and by the low on its middle input on lead 281 from the low Q output in FIG. 28 of FF1.

SUMMARY OF CLEARING OPERATION

In FIG. 28, the input flip-flop FF1 is in a cleared condition (Q low—$\overline{Q}$ high) with its CL input high, its D input high and its CP input low. In this condition, FF1 is conditioned to respond to a low-to-high transition at its CP input. When such a transition occurs, which will be at the first low-to-high (make-to-break) transition from the output of the DIAL PULSE INPUT, FF1 will make its Q output the same as its D input—i.e., Q high and $\overline{Q}$ low.

In FIG. 28, the division flip-flop FF3 is in the cleared condition (Q low—$\overline{Q}$ high) with its CL input high, its D input high, and its CP input low. In this condition, FF3 is conditioned to respond to a low-to-high transition at its CP input to make its Q output the same as its D input. This cannot occur at least until the input flip-flop FF1 of FIG. 28 is cleared (Q goes from high to low), which in turn cannot occur until the end of processing the series of break intervals.

In FIG. 29, counter CN6 is cleared to zero count (outputs Q1, Q2, Q4 and Q8 low) with its SD- inputs high, with its CD input high and its CP input high. In this condition, CN6 is conditioned to count high-to-low transitions at its CP input. As long as the division flip-flop FF3 of FIG. 28 is in the cleared condition, its low Q output disables gate G46 to maintain the output of G46 high on lead 287 into FIG. 29 at the CP input to CN6.

In FIG. 31, each of counters CN2 and CN3 is set at a count of nine (C output low) with its R9(1) input high, with the CP input to CN2 carrying 10-kHz. clock pulses, and with the CP input of CN3 low from the C output of CN2. Counters CN2 and CN3 are arranged, as soon as their R9(1) inputs are made low, to count high-to-low transitions at their CP inputs. This cannot occur until the leading edge (low-to-high) of the first high input break interval occurs.

In FIG. 32, each of counters CN4 and CN5 is cleared to zero count (outputs Q1, Q2, Q4 and Q8 low) with its SD- inputs high, with its CD input high, with the CP input to CN4 high, and with the CP input to CN5 low at the low Q8 output of CN4. In this condition, counters CN4 and CN5 are conditioned to respond to high-to-low transitions at their CP inputs. These transitions will be supplied to the CP input to CN4 over lead 313 from FIG. 31, through I50 from the 100-Hz. "clock pulses" under the control of CN2 and the 10-kHz. clock source.

In FIG. 30, the carry flip-flop FF2 is in a set condition (Q high—$\overline{Q}$ low) with its K input high, its SD input high, and its CP input low from the low A output of counter CN14. In this condition, FF2 is arranged to respond to a high-to-low transition at its CP input to go to a cleared condition (Q low—$\overline{Q}$ high): this will occur when the A output of CN14 provides a short high pulse at such time as CN14 is driven from a count of zero to a count of nine.

In FIGS. 29 and 30, each of the counters CN7, CN8, CN9 and CN10 of the lower register is set to a count of zero (all Q1, Q2, Q4 and Q8 outputs low) with its SD- inputs high, its CD input high, with the CP inputs high to CN7 and CN8, and with the CP inputs low to CN9 and CN10. In this condition, these counters are arranged to respond to high-to-low transitions at their CP inputs to up-count 10-kHz. clock pulses: CN7 will count units; CN8 will count tens; CN9 will count hundreds; and, CN10 will count thousands. This counting of the 10-kHz. clock pulses will occur only during the high break interval inputs.

In FIGS. 29 and 30, each of counters CN11, CN12, CN13 and CN14 of the upper register is set to a count of zero (all Q1, Q2, Q4 and Q8 outputs low) with its CL- inputs high, its PS input high, with the CP input to CN111 high, and with the CP inputs low to CN12, CN13 and CN14. In this condition, these counters are arranged to respond to low-to-high transitions at their CP inputs to down-count 130-kHz. clock pulses: such will not occur until the division flip-flop FF3 of FIG. 28 is set (Q high—$\overline{Q}$ low) so that gate G45 of FIG. 28 can pass 130-kHz. clock pulses over lead 289 into FIG. 29 to the CP input to CN11. CN11 will down-count units; CN12 will down-count tens; CN13 will down-count hundreds; and, CN14 will down-count thousands. This down-ounting is part of the division process which occurs after the accumulation of data from the incoming dial pulses.

In FIG. 30, the decoder and readout circuits NX3, NX2 and NX1 will visually display the tens, units and tenths (decimal point lamp DECPT lit between NX2 and NX1) values in respective down-counters CN14, CN13 and CN12.

Leading Edge of First Break

After the clearing operation, the accumulation of data begins when the DIAL PULSE INPUT of FIG. 28 provides at its output the first low-to-high transition at the leading edge of the first break interval. When this occurs, the following circuit operations take place:

1. in FIG. 28, the input flip-flop FF1 is set (Q high—$\overline{Q}$ low);

2. in FIG. 28, the pulse number counter CN1 advances one count from its starting count of nine (A and D high - B and C low) to the count of zero (A, B, C and D low);

3. in FIG. 31, counters CN2 and CN3 are controlled by the 10-kHz. clock to produce 100-Hz. "clock pulses" at the C output of CN3;

4. in FIG. 32, counters CN4 and CN5 start counting 100-Hz. clock pulses;

5. in FIGS. 29 and 30, the lower register (counters CN7, CN8, CN9 and CN10) start counting 10-kHz. clock pulses.

In FIG. 28 when the DIAL PULSE INPUT provides the first break interval of a series of telephone dial pulses, its output goes from low to high at the CP input to FF1, at the left input to G6, and at the input to I11. The low-to-high transition at the CP input to FF1 sets FF1, making its Q output go from low to high and making its $\overline{Q}$ output go from high to low. The high Q output of FF1 renders high the upper input to REG1; and, the low $\overline{Q}$ output of FF1 is effective as a high output from I14 at the lower input to REG1 after a 0.3-$\mu$sec. delay in DEL1. The high Q output of FF1 is effective through I7 to render low the right input to collector tie CT2 and through DEL2 to at once render low the output of CT2 at the R9(1) input to CN1.

The high output of I14 is effective through G6 to provide a high-to-low transition at the CP input to CN1 and at the input to I10. With its R9(1) input low, counter CN1 responds to the high-to-low transition at its CP input to advance one count from its starting count of nine (A and D high - B and C low) to the count of zero (A, B, C and D low). Outputs A and D of counter CN1 thus go low to render low the left input to G5, to in turn hold the output of G5 high. In the meantime, the low-to-high input to I11, from the DIAL PULSE INPUT, provides at its output a high-to-low transition, which is effective through DELSS1 as a 1-μsec. low pulse delayed 1 μsec.: the delayed 1-μsec. low pulse from DELSS1 is effective through I16 as a 1-μsec. high at the right input to G5, which has no effect on the high output of G5 whose left input is low. At the end of the 1-μsec. pulse from DELSS1, the output of DELSS1 returns to high and the output of I16 returns to low at the right input to G5.

The high Q output of FF1 extends over lead 281 into FIG. 31 to the middle input to G38 and to the left input to G7; and, the high output in FIG. 28 of I10 extends over lead 282 into FIG. 31, where it is effective through G37 and I49 to render high the upper input to G38. The high-to-low output of G7 is effective at once through DEL4 to render low the R9(1) inputs to counters CN2 and CN3.

In FIG. 31, with the CP inputs low to counters CN2 and CN3, the 10-kHz. clock pulses (for example, 50-μsec. low and 50-μsec. high) will be effective to produce 100-Hz. "clock pulses" (for example, 5-msec. low and 5-msec. high) at the C output of CN3. Counter CN2 will respond to each high-to-low 10-kHz. clock pulse transition at its CP input to advance one count; and, counter CN3 will respond to each high-to-low transition at its CP input from the C output of CN2 to advance one count. With counter CN2 starting from a count of nine (C output low), its C output will stay low from 9 to 0 to 1 to 2 to 3, will go from low to high at the count of 4, will stay high from 4 to 5 to 6 to 7, will go from high to low from 7 to 8, and will stay low from 8 to 9 to 0 to 1, etc. Thus, it will take nine counts before the C output of CN2 produces the first high-to-low transition; and, the C output of CN2 will produce a high-to-low produce a high-to-low transition for each 10 input counts thereafter. Likewise, counter CN3 will produce the first low-to-high transition at its C output upon the fifth input count (9 to 0 to 1 to 2 to 3 to 4); and, the C output of CN3 will produce a low-to-high transition for each 10 input counts thereafter. Thus, as long as the R9(1) inputs to counters CN2 and CN3 are low, the C output of CN3 will produce 100-Hz. "clock pulses" (5-msec. highs and 5-msec. lows).

In FIG. 31, the 100-Hz. clock pulses from the C output of CN3 are repeated through I50 and over lead 313 into FIG. 32 to the CP input to counter CN4, which will respond to count the high-to-low clock pulse transitions. Counter CN4 will advance from its starting count of zero and will progress one count for each high-to-low transition at its CP input. The count will go from 0 to 1 to 2 to 3 to 4, etc. to 14 to 15 to 0 to 1, etc. Using the decimal weighings of 1, 2, 4 and 8 for the respective outputs Q1, Q2, Q4 and Q8, the following table shows the status of the outputs for the successive equivalent decimal values:

| Decimal count | 1<br>Q1 | 2<br>Q2 | 4<br>Q4 | 8<br>Q8 |
|---|---|---|---|---|
| 0 | L | L | L | L |
| 1 | H | L | L | L |
| 2 | L | H | L | L |
| 3 | H | H | L | L |
| 4 | L | L | H | L |
| 5 | H | L | H | L |
| 6 | L | H | H | L |
| 7 | H | H | H | L |
| 8 | L | L | L | H |
| 9 | H | L | L | H |
| 10 | L | H | L | H |
| 11 | H | H | L | H |
| 12 | L | L | H | H |
| 13 | H | L | H | H |
| 14 | L | H | H | H |
| 15 | H | H | H | H |
| 0 | L | L | L | L |
| 1 | H | L | L | L |
| 2 | L | H | L | L |
| etc. | — | — | — | — |

NOTE.—L means low; H means high.

The Q8 output of CN4 will go from low to high upon the eighth count in CN4, will stay high through the 15th count, will go from high to low on the 16th count (back to zero count), and will again stay low until the next eighth count. The Q8 output of CN4 will thus provide a high-to-low transition to the CP input of counter CN5 once every 16 counts of the 100-Hz. clock. Counter CN5 will respond to each such high-to-low transition at its CP input to count from 0 to 1 to 2, etc. to 8 to 9 to 0 to 1, etc. The total capacity of counters CN4 and CN5 will thus be 159 counts of the 100-Hz. clock —nine counts in CN5 and 15 counts in CN4. Since each 100-Hz. clock period is 10 msec., counters CN4 and CN5 have the capacity to count up to 159 tens of milliseconds (1,590 msec.).

In FIG. 31, G38, with its upper two inputs high, will repeat 10-kHz. clock pulses over lead 312 into FIG. 28, through G56, over lead 286 into FIG. 29, and through G58 to the CP input to counter CN7. Counter CN7 will count each high-to-low clock pulse at its CP input to advance from its starting count of zero to 1 to 2 to 3, etc. to 8 to 9 to 0 to 1, etc. In FIG. 28, the high $\overline{Q}$ output of the division flip-flop FF3 extends to the upper input to G44 and over lead 314 into FIG. 31, thence through FIG. 32 into FIG. 33 at the input to I57 and to the lower input to G64. The output of G64 thus is high at the left input to collector tie CT5, whose output thus is high on lead 331 into FIG. 30 at the CP input to counter CN8. Each time, in FIG. 29, that the Q8 output of counter CN7 goes from high-to-low (when counter CN7 goes from the count of nine to the count of zero), the high-to-low transition extends over lead 321 into FIG. 32 to cause single shot SS11 to produce a 1-μsec. low output pulse, which is effective through I63, lead 320 into FIG. 33, G64 and CT5 as a 1-μsec. low pulse on lead 331 into FIG. 30 to the CP input to counter CN8. Counter CN8 thus counts one count for each 10 counts in counter CN7 of FIG. 29. In FIG. 30, the Q8 output of CN8 is effective through I26 and G65 to provide at the CP input to CN9 one high-to-low transition each time counter CN8 advances from the count of nine to the count of zero. Also, in FIG. 30, counter CN10 has its CP input controlled by the Q8 output of CN9 so as to count each 10th count in counter CN9. These counters CN7, CN8, CN9 and CN10 of the lower register thus count respectively units, tens, hundreds and thousands of 10-kHz. clock pulses, which represent respectively tenths, units, tens and hundreds of milliseconds.

As a result of the above circuit operations, initiated at the leading edge of the first break interval from the DIAL PULSE INPUT of FIG. 28, the period counter (CN4 and CN5) of FIG. 32 starts counting 100-Hz. clock pulses and the lower register (CN7, CN8, CN9 and CN10) of FIGS. 29 and 30 starts counting 10-kHz. clock pulses.

During First Break

Throughout the duration of the first break interval output from the DIAL PULSE INPUT of FIG. 28, the circuit stays in the above-described condition with the period counter (CN4 and CN5) of FIG. 32 accumulating a 100-Hz. clock pulse count and with the lower register (CN7, CN8, CN9 and CN10) of FIGS. 29 and 30 accumulating a 10-kHz. clock pulse count.

End of First Break

At the end of the first break interval (the high-to-low transition of the break-to-make output in FIG. 28 of the DIAL PULSE INPUT), the left input in FIG. 28 of G6 goes low to produce a high output from G6 and a low output from I10. The low output of I10 extends into FIG. 31 where it is effective through G37 and I49 as a low at the upper input to G38. The output of G38 is thus made high and held high to stop transmission of 10-kHz. clock pulses over lead 312. Lead 312 goes high into FIG. 28 to cause the output of G56 to be low on lead 286 into FIG. 28 at the upper input to G58, the output of which goes high and stays high at the CP input to counter CN7. Counter CN7 thus stops counting 10-kHz. clock pulses.

During First Make

From the above, it is apparent that during the first make interval, the period counter (CN4 and CN5 of FIG. 32) continues to count 100-Hz. clock pulses; whereas, the lower register (counters CN7, CN8, CN9 and CN10) of FIGS. 29 and 30 stops counting 10-kHz. clock pulses at the start of the first make interval.

Second Break Interval

At the leading edge of the second break interval, the output in FIG. 28 of the DIAL PULSE INPUT provides a low-to-high transition, which is repeated at the output of G6 as a high-to-low transition at the CP input to counter CN1, which thereupon advances from the count of zero (A and D low) to the count of one (A high - D low). With output D of CN1 still low, the left input to G5 is held low and the output of G5 is held high.

The low output in FIG. 28 of G6 is effective through I10, over lead 282 into FIG. 31, G37 and I49 as a high at the upper input to G38. G38 is thus enabled again to pass 10-kHz. clock pulses over lead 312 into FIG. 28, through G56, over lead 286 into FIG. 29, and through G58 to the CP input to counter CN7, which thereupon again serially adds 10-kHz. clock pulses to the accumulating count in the lower register.

In the meantime, the counters CN4 and CN5 of FIG. 32 continue uninterruptedly to accumulate the 100-Hz. clock pulse count.

Second Make Interval

As above, at the start of the second make interval, the period counter (CN4 and CN5 of FIG. 32) will continue to accumulate the 100-Hz. clock pulse count; whereas, gate G38 of FIG. 31 will be disabled to stop the accumulation of the 10-kHz. clock pulse count in the lower register (counters CN7, CN8, CN9 and CN10) of FIGS. 29 and 30.

Through The Ninth Make Interval

The above process will continue through the end of nine full pulse periods. That is, the period counter (CN4 and CN5) of FIG. 32 will accumulate the 100-Hz. clock pulse count continuously for the first nine full pulse periods (nine breaks and nine makes); and, the lower register (counters CN7, CN8, CN9 and CN10) of FIGS. 29 and 30 will accumulate the 10-kHz. clock pulse count only for the sum of the durations of the first nine break intervals.

At the leading edge of the ninth break interval, when the output from the DIAL PULSE INPUT of FIG. 28 changed from low to high, counter CN1 was advanced from the count of seven (A high - D low) at the start of the eighth break to the count of eight (A low - D high) at the start of the ninth break.

Leading Edge of Tenth Break-Transfer

When the DIAL PULSE INPUT of FIG. 28 provides the low-to-high transition at the leading edge of the 10th break interval, a period of 12-μsec. is provided during which the following circuit operation take place:

1. the counting of 10-kHz. clock pulses is stopped in the lower register (counters CN7, CN8, CN9 and CN10) of FIGS. 29 and 30;

2. the counting of 100-Hz. clock pulses is stopped in the period counter (counters CN4 and CN5) of FIG. 32; and, 3. the accumulated break count in the lower register is transferred as the same count into the upper register (counters CN11, CN12, CN13 and CN14) of FIGS. 29 and 30.

When the DIAL PULSE INPUT provides 4low-to-high transition at the leading edge of the 10th break interval, the low-to-high change appears at the left input to G6, at the CP input to FF1, and at the input to Ill. The high-to-low output of Ill energizes single shot SS3 to produce a 12-μsec. low output pulse, which is effective through I12 as a 12-μsec. high pulse at the input to SS4. The output of SS4 remains high for 12 μsec. and is effective for that 12 μsec. through I38 to hold the left input low to G34 and to hold high the output of G34 on lead 284 into FIG. 31. At the end of the 12-μsec. low from SS3, the return to low at the input to SS4 will generate from SS4 a 0.75-μsec. low pulse, which will be effective through I38 and G34, as will be described later, to initiate circuit operations for starting the division phase of the overall circuit operation.

The low-to-high transition at the left input to G6 in FIG. 28 produces a high-to-low transition at the output of G6 at the CP input of the counter CN1 and at the input to I10. Counter CN1 thereupon advances from its count of eight (D high - A low, at the leading edge of the previous ninth break) to the count of nine (A and D high), thus making the left input high to G5. The low input to I10 is effective through I10, lead 282 into FIG. 31, G37 and I49 to make the upper input to G38 high. G38 is thus (at that instant) enabled to pass low-to-high 10-kHz. clock pulses; however, as will be seen shortly, G38 is disabled again in about 1 μsec.

In FIG. 28, the high-to-low transition from I11 energized delayed single shot DELSS1 to produce a 1-μsec. low output pulse delayed for 1 μsec. The delayed 1-μsec. low from DELSS1 is effective through I16, G5 and I9 as a 1-μsec. high output pulse from I9. The 1-μsec. high pulse from I9 is effective through I72 and CT1 as a 1-μsec. low pulse at the CL input to FF1, which clears FF1 to make its Q output go from high-to-low and its $\overline{Q}$ output go from low-to-high. The low Q output of FF1 is effective through I7 to make high the right input to CT2; however, the 1-μsec. high pulse from I9 is effective through I8 to hold low the upper input to CT2. At the end of the 1-μsec. low pulse from DELSS1, the output of DELSS1 returns to high, the output of I16 returns to low, the output of G5 returns to high, and the output of I9 returns to low. The low output of I9 is effective through I72 and CT1 to return to high the CL input to FF1 and is effective through I8, CT2 and DEL 2 to render high the R9(1) input to counter CN1 after 0.2-μsec. delay in DEL2. The return to high of the R9(1) input to CN1 holds CN1 at the count of nine (A and D high).

When the input flip-flop FF1 of FIG. 28 is cleared, as above described, about i μsec. after the leading edge of the 10th input break interval, its low Q output extends over lead 281 into FIG. 31 to make low the middle input to G38 and the left input to G7. The 10-kHz. gate G38 is thus disabled with its output held high, thus stopping the supply of 10-kHz. clock pulses on lead 312 into FIG. 28. The high output of G7 is effective through DEL4 to make the R9(1) inputs to CN2 and CN3 high after a delay of 0.3 μsec. in DEL4: each of counters CN2 and CN3 is thus reset to the count of nine (C output low) and is held there to stop the supply of 100-Hz. clock pulses from the C output of CN3. As a consequence of these circuit actions, the lower register (CN7, CN8, CN9 and CN10) of FIGS. 29 and 30 stops accumulating the 10-kHz. break count and the period counter (CN4 and CN5) of FIG. 32 stops accumulating the 100 -Hz. pulse period count.

In FIG. 28, when the input flip-flop FF1 is cleared, as above discussed, its high $\overline{Q}$ output is effect at the output of I14 as a high-to-low transition. This output of I14 is effective through G6 to return to high the CP input to CN1 and is effective through G6, I10, lead 282 into FIG. 31, G37 and I49 to hold low the upper input to the 10-kHz. gate G38.

The high-to-low transition in FIG. 28 of the Q output of FF1 energizes the upper input to regeneration circuit REG1, which thereupon provides a 10-μsec. low output pulse on lead 283 into FIG. 29. The high-to-low output of I14 is also effective at once through DEL1 to energize the lower input to REG1. The 10-μsec. low output pulse from REG1 thus starts 1-μsec. after the low-to-high input break interval transition and will end 1 μsec. before the end of the 12-μsec. high input in FIG. 28 (above discussed) to SS4. The 10-μsec. interval generated by REG1 is used to accomplish the transfer of data from the lower register to the upper register in FIGS. 29 and 30.

In FIG. 29, the 10-μsec. low on lead 283 energizes SS7 and is effective through G8 and DEL5 to hold the lower input to G14 low for 0.3 μsec. and then to allow the lower input to G14 to go high for 9.7 μsec. (the balance of the 10-μsec. interval). SS7 produces a 5-μsec. low output pulse which is effective through G10 and I20 as a 5-μsec. low pulse at the input to I21, at the upper input to G14, and over lead 291 into FIG. 30 and through G30 and I36 as a 5-μsec. low pulse at the K input to FF2 to prevent FF2 from changing state for at least 5 μsec. In the meantime, in FIG. 29 the 5-μsec. low on lead 291 is effective through I21, DEL6 and G15 to apply a 4.4-μsec. low to lead 290 (the 5-μsec. pulse delayed 0.6 μsec. in DEL6) at the PS inputs in FIGS. 29 and 30 of counters CN11, CN12, CN13 and CN14. This low pulse sets each counter to its maximum count of 15 (all Q1, Q2, Q4, and Q8 outputs high). At the end of the 4.4-μsec. low pulse from G15 in FIG. 29, which is the end of the 5-μsec. low pulse from I20 at the upper input to G14, the output of SS7 returns to high, the output of G10 returns to low, and the output of I20 returns to high on lead 291. The output of I21 returns to low, to at once return the output of DEL6 to low and the output of G15 to high on lead 290. The high on lead 291 in FIG. 29 extends into FIG. 30 where it is effective through G30 and I36 to return to high the K input of FF2. In FIG. 29, as soon as lead 291 goes high at the upper input to G14, the output of G14 goes low for the last 5 μsec. of the 9.7-μsec. high pulse on its lower input. The 5-μsec. low from G14 energizes SS10 to produce a 2-μsec. low output pulse, which is effective through G16 to apply a 2-μsec. high pulse to the transfer lead 292 in FIGS. 29 and 20. In FIG. 30, the high on lead 292 is effective through I35 as a 2-μsec. low at the SD input of FF2: this will cause FF2 to be in its direct set state (Q high—$\overline{Q}$ low); however, FF2 is already set, so it will stay that way.

In FIGS. 29 and 30, the 2-μsec. high pulse on the transfer lead 292 will render high the left inputs to each of the transfer gates G75 through G78 of FIG. 29 and G18 through G29 of FIG. 30. With the transfer gates thus enabled, during the 2-μsec. transfer time and accumulated 10-kHz. break count in the lower register (CN7, CN8, CN9 and CN10) of FIGS. 29 and 30 will be transferred into the upper register (CN11, CN12, CN13 and CN14) of FIGS. 29 and 30. As an example, let it be assumed that the sum of the nine break intervals (assume about 60 msec. each) was such as to cause a count of 5,432 of the 10-kHz. clock pulses to have been accumulated in the lower register. Thus, CN10 (FIG. 30) is set to the count of five (Q1 and Q4 high—Q2 and Q8 low), CN9 (FIG.30) is set to the count of four (Q4 high—Q1, Q2 and Q8 low), CN8 (FIG. 30) is set to the count of three (Q1 and Q2 high—Q4 and Q8 low), and CN7 (FIG.29) is set to the count of two (Q2 high—Q1, Q4 and Q8 low). It will be recalled, from previous description, that counter CN11 (FIG. 29) is preset to its maximum count of 15 with each of its cells set to the one state (outputs Q1, Q2, Q4 and Q8 high). With the 2-μsec. high on the left inputs to the transfer gates G75 through G78, the low Q1 output of CN7 is effective through I45 and G75 as a 2-μsec. low pulse at the CL1 input to CN11. Likewise, the low Q4 and Q8 outputs of CN7 are effective as lows at the CL4 and CL8 inputs to CN11. The high Q2 output of CN7, on the other hand, is effective as a high at the CL2 input to CN11. With its PS input high and with each of its cells set to state one, any low on a CL- input will clear the corresponding cell to its zero state and any high on a CL- input will leave the corresponding cell in its one state. Thus, cells 1, 4 and 8 of CN11 will be cleared (outputs Q1, Q4 and Q8 low) and cell 2 will be left set (output Q2 high). The result of this operation is to set CN11 to a count of two (Q2 high—Q1, Q4 and Q8 low) to correspond to the count of two in CN7. In FIG. 30, the count of three in CN8 (Q1 and Q2 high—Q4 and Q8 low) will be transferred in like manner to CN12 as a count of three therein (Q1 and Q2 high—Q4 and Q8 low). In like manner, the count of four in CN9 is transferred to CN13 (Q4 high—Q1, Q2 and Q8 low) and the count of five in CN10 is transferred to CN14 (Q1 and Q4 high—Q2 and Q8 low).

At the end of the 2-μsec. transfer pulse, the output in FIG. 29 of SS10 returns to high, to in turn return to low the output of G16 on the transfer lead 292 in FIGS. 29 and 30: thus, all of the transfer gates G75 through G78 of FIG. 29 and G18 through G29 in FIG. 30 are disabled to return to high all of the CL- inputs to each of the counters CN11, CN12, CN13 and CN14 of FIGS. 29 and 30. In FIG. 30, the return to low on lead 292 is effective through I35 to return to high the SD input to the carry flip-flop FF2.

At the end of the 10-μsec. pulse interval from REG1 of FIG. 28, the output of REG1 returns to high, the output of G8 in FIG. 29 returns to low, the output of DEL5 in FIG. 29 returns at once to low, and the output of G14 in FIG. 29 returns to high.

All of the above operations will have consumed 11 μsec. of the 12-μsec. (above-mentioned) high pulse in FIG. 28 at the input to SS4. As a result of these operations, the following conditions prevail:

1. the upper register (CN11, CN12, CN13 and CN14) of FIGS. 29 and 30 contains the same 10-kHz. break count as in the lower register (CN7, CN8, CN9 and CN10) of FIGS. 29 and 30—namely 5,432;
2. the carry flip-flop FF2 of FIG. 30 is set (Q high—$\overline{Q}$ low);
3. in FIG. 29, counter CN6 is still cleared (Q1, Q2, Q4 and Q8 low) from the initial clearing operation;
4. in FIG. 28, the input flip-flop FF1 is cleared (Q low—$\overline{Q}$ high);
5. in FIG. 28, the pulse counter CN1 is set and held to the count of nine (A and D high);
6. in FIG. 28, the division flip-flop FF3 is still in the cleared condition (Q low—$\overline{Q}$ high);
7. in FIG. 31, each of the counters CN2 and CN3 is set and held at the count of nine (C output low); and ,
8. in FIG. 32, the 100-Hz. pulse period counter (CN4 and CN5) is set to whatever count was accumulated during the nine full pulse periods.

With regard to the period counter (CN4 and CN5) of FIG. 32, let is be assumed that the total duration of the nine full pulse periods was such as to cause CN4 and CN5 to have accumulated a 100-Hz. count of 93. Thus, CN5 will be set at a count of 5 (Q1 and Q4 high—Q2 and Q8 low), which represents 80 counts (five times the basic count of 16 from CN4); and, CN4 will be set at a count of 13 (Q1, Q4 and Q8 high—Q2 low).

Leading Edge of Tenth Break-Preparation for Division

It will be recalled, from the previous section description, that a period of 12 μsec. was provided after the leading edge of the 10th break input within which to stop the 10-kHz. break count in the lower register of FIGS. 29 and 30, to stop the 100-kHz. period count in the period counter of FIG. 32, and to transfer the accumulated 10-kHz. break count from the lower register to the upper register in FIGS. 29 and 30.

In FIG. 28, when the input flip-flop FF1 was cleared (Q low—$\overline{Q}$ high) some 1 μsec. after the leading edge of the 10th break input, the high-to-low transition from the Q output of FF1 on lead 281 energized single shot SS5 to produce a 25-μsec. high pulse from the output of I39 at the right input to G34. At the end of the 12-μsec. low pulse from SS3, the output of SS3 returns to high to provide a return from high-to-low at the output of I12. The high-to-low transition from I12 energizes SS4 to produce a 0.75-μsec. low output pulse, which is effective through I38 as a 0.75 high pulse at the left input to G34. G34 thereupon produces a 0.75-μsec. low output pulse on lead 284 into FIG. 31 at the upper input to G40 and over lead 284 into FIGS. 28, 29 and 32.

In FIG. 28, the 0.75-μsec. low pulse on lead 284 is effective through G39 to apply a 0.75-μsec. high pulse to the CP input to the division flip-flop FF3, which sets FF1 (Q high, like the D input—$\overline{Q}$ low). The 0.75-μsec. low pulse on lead 284 in FIG. 31 extends through FIG. 32 and into FIG. 29 to the next-to-upper input to G55, which thereupon provides a 0.75-μsec. high pulse at the input to DEL8. The output of DEL8 is held low for 0.3 μsec. and then goes high for 0.45 μsec. (the rest of the 0.75-μsec. interval). The 0.45-μsec. high pulse from DEL8 is effective through G54 as a 0.45 low output pulse at the CD inputs to counters CN6 and CN7: counter CN6 is cleared (should already be there) to zero count (Q1, Q2, Q4 and Q8 low); and, counter CN7 is cleared to zero count (Q1, Q2, Q4 and Q8 low).

In FIG. 31, the 0.75-μsec. low pulse on lead 284 is effective through G40 and G41 as a 0.75-μsec. low pulse on lead 311 into FIG. 28, thence into FIG. 29 at the lower input to G55 (causes the same effect as the 0.75-μsec. low on lead 284 at its next-to-upper input), thence into FIG. 30 to the CD inputs to counters CN8, CN9 and CN10, each of which is thereupon cleared to zero count (all Q1, Q2, Q4 and Q8 outputs low).

In FIG. 28, the low $\overline{Q}$ output of FF3 renders low the upper input to G56 and the D input to FF1. The output of G56 is thus made high on lead 286 into FIG. 29 to the upper input to G58, the output from which goes low at the CP input to CN7, which high-to-low transition at the CP input has no effect other than perhaps to add one count in CN7 just ahead of the above-described 0.45-μsec. low clearing pulse on its CD input: since the transfer gates G75 through G78 are disabled, such an additional count in CN7 can have no effect on CN11. In FIG. 28, the low $\overline{Q}$ output from FF3 is applied to lead 314 at the upper input to G44 (whose output goes to high), on lead 314 into FIG. 31, thence into FIGS. 32 and 33. In FIG. 33, the low on lead 314 appears at the lower input to G64 to maintain high the output of G64 at the left input to CT5. Also, in FIG. 33, the low on lead 314 is effective through I57 as a high input to SS13.

In FIG. 28, the high Q output of FF3 extends to the left input to G45 and to he right input to G46, thus enabling these gates G45 and G46 to start passing 130-kHz. clock pulses (perhaps 4- to 5-μsec. high and 4- to 5-μsec. low) as soon as the 130-kHz. clock provides a high output —as will be described below. For the moment, it is assumed that the 130-kHz. clock output is low. In FIG. 28, the high Q output of FF3 extends over lead 293 into FIG. 29 to the upper input to G57.

In FIG. 29, with counter CN6 set at zero count, each of its outputs Q1, Q2, Q4 and Q8 is low. These lows are effective through respective I59, I60, I61 and I62 as highs on leads 297, 296, 295 and 294 into FIG. 32 at the upper inputs to gates G52, G51, G50 and G49. In FIG. 32, with counter CN4 containing the count of 13 (above discussed), its Q2 output is low at the lower input to G51 while its Q1, Q4 and Q8 outputs are high at the lower inputs to G52, G50 and G49. The outputs of G49, G50, G51 and G52 at the four inputs to collector tie CT3 are respectively low, low, high and low, thus to hold low the output of CT3 at the upper input to collector tie CT4, whose resulting low output appears at the right input to G53 to hold high the output from G53. In FIG. 29, the low Q8 output of counter CN6 appears at the lower input to G57 (to hold it output high) and on lead 298, through FIG. 30 and into FIG. 33 where it appears low at the upper input to G67, whose output is thus held high.

In FIG. 29, with counter CN7 cleared to zero count, its low Q1, Q2, Q4 and Q8 outputs are effective through inverters I45, I46, I47 and I48 as highs on respective leads 323, 324, 326 and 325 into FIG. 32 at the upper inputs to respective gates G63, G62, G61 and G60. In FIG. 32, with counter CN5 containing the count of five (above discussed), its Q1 and Q4 outputs are high at the lower inputs to gates G63 and G61 while its Q2 and Q8 outputs are low at the lower inputs to gates G62 and G60. The outputs of gates G60, G61, G62 and G63 at the four lower inputs to collector tie CT4 are respectively high, low, high and low. In FIG. 32, the highs on leads 325 and 326 (from the low Q8 and Q4 outputs in FIG. 29 of CN7) extend into FIG. 33 to the two inputs to G66, whose resulting low output appears at the upper input to G68 and at the input to I73. Also, in FIG. 29, the low Q8 output of CN7 extends over lead 321 into FIG. 32 to the input to SS11.

At the end of the 0.75-μsec. low output pulse from SS4 in FIG. 28, the output of SS4 returns to high, the output of I38 returns to low at the left input to G34, the output of G34 returns to high on lead 284 into FIGS. 31 and 28 and 32 and 29 and at the upper input in FIG. 31 of G40, the output of G40 in FIG. 31 returns to low, and the output of G41 in FIG. 31 returns to high on lead 311 into FIGS. 28 and 29 and 30. In FIG. 28, the output of G39 returns to low at the CP input to FF3; in FIG. 29, the output of G55 returns to low, to at once through DEL8 and G54 return to high the CD inputs to CN6 and CN7; and, in FIG. 30, the CD inputs to CN8, CN9 and CN10 and returned to high.

At the end of the 25-μsec. low output pulse in FIG. 28 from SS5, the output of SS5 returns to high and the output of I39 returns to low at the right input to G34.

The circuit is prepared for the division process to be described below.

Summary—Preparation For Division

The previous description concluded with he circuit prepared to start the division phase of the overall computation of % BK. The following is the status of the circuit, assuming the output in FIG. 28 of the 130-kHz. clock (about 4- or 5-μsec. low and about 4- or 5-μsec. high) to be low at the left input to G46 and at the right input to G45:

1. in FIG. 28, the input flip-flop FF1 is cleared (Q low—$\overline{Q}$ high) and the division flip-flop FF3 is set (Q high—$\overline{Q}$ low);

2. in FIG. 28, the pulse number counter CN1 is set and held at the count of nine (A and D high);

3. in FIG. 31, each counter CN2 and CN3 of the 100-Hz. clock source is set and held at the count of nine (C output low);

4. in FIGS. 29 and 30, the upper register (counters CN14, CN13, CN12 and CN11) is set at the assumed count of 5,432 representing the accumulation of 10-kHz. clock pulses during the sum of the nine break intervals;

5. in FIG. 30, the decoder and readout circuits NX3, NX2 and NX1 will have decoded and visually displayed the 54.3 (decimal point lamp DECPT lit) in respective counters CN14, CN13 and CN12;

6. in FIG. 30, each counter CN8, CN9 and CN10 of the lower register is cleared to zero count (Q1, Q2, Q4 and Q8 low);

7. in FIG. 30, the carry flip-flop FF2 is set (Q high—$\overline{Q}$ low);

8. in FIG. 32, the period counter (CN4 and CN5) is set to the assumed count of 93 (CN4 set at 13, Q1 and Q4 and Q8 high, Q2 low—CN5 set at 5, Q1 and Q4 high, Q2 and Q8 low) representing the accumulation of 100-Hz. clock pulses during the entire time of the nine full pulse periods (makes plus breaks); and, 9. in FIG. 29, each of counters CN6 and CN7 is cleared zero count (Q1, Q2, Q4 and Q8 low).

In FIG. 29, counter CN7, which was part of the lower register (along with counters CN8, CN9 and CN10 of FIG. 30), has been divorced from counter CN8. The Q8 output of CN7 extends over lead 321 into FIG. 32 to the input of SS11, whereby, as previously described, through SS11 and I63, each high-to-low transition at the Q8 output of CN7 was effective as a 1-μsec. high output from I63 on lead 320 into FIG. 33 at the upper input to G64. Prior to the setting in FIG. 28 of the division flip-flop FF3, its high $\overline{Q}$ output extended over lead 314 through FIGS. 31 and 32 into FIG. 33 to the lower input to G64, thus to allow 1-μsec. high pulses at the upper input to G64 to be repeated through G64 and CT5 over lead 331 into FIG. 30 to the CP input to counter CN8. With the division flip-flop FF3 of FIG. 28 set, its low $\overline{Q}$ output on lead 314 into FIG. 33 disables gate G64 to divorce the Q8 output of counter CN7 of FIG. 29 from the CP input of counter CN8 in FIG. 30.

In FIGS. 29 and 32, counters CN6 and CN7 will cooperate with counters CN4 and CN5 during the division phase. Counters CN6 and CN7 will work together as a recycling counter to count 130-kHz. clock pulses. The period counter, comprising counters CN4 and CN5 will continue to retain its 100-Hz. count of 93. The two collector ties CT3 and CT4 of FIG. 32, with their associated circuitry, act as a period comparator to compare the accumulating 130-kHz. clock count in the recycling counter (CN6 and CN7) with the existing period count of 93 in the period counter (CN4 and CN5). The output in FIG. 32 of collector tie CT4 at the right input to G53 will remain low at all times except when the 130-kHz. count in counters CN6 and CN7 equals the count (93) in counters CN4 and CN5, at which time the output of collector tie CT4 in FIG. 32 will go high at the right input to G53. When this occurs, the recycling counter (CN6 and CN7) will be set to zero under control of a 130-kHz. clock pulse, one "block count" will be added into the cleared counter CN9 of FIG. 30, and the counting and comparing will repeat. Each time the recycling counter (CN6 and CN7) counts up to the same count (93) as registered in the period counter (CN4 and CN5), one more (units) block count will be added into CN9 of FIG. 30; and, every 10th block count in CN9 will insert one (tens) block count into counter CN10.

In the meantime (during the block counting), the same 130-kHz. clock pulses are used to down-count in the upper register (counters CN11 through CN14) of FIGS. 29 and 30. Thus, the total break count (5,432) in the upper register will gradually be dissipated toward zero count as each block count is counted in counters CN9 and CN10 of FIG. 30. The block counting and down-counting will continue until the count in the upper register (particularly counter CN14) of FIGS. 29 and 30 is reduced from zero count to the count of 9,999 as detected by the carry flip-flop FF2 of FIG. 30. Thereafter, the circuit readjusts itself to take into account any partial count in counters CN6 and CN7 of FIG. 29 as a partial block count in order to adjust the block count in CN8 or CN9 of FIG. 30, if necessary.

The result of the block count part of the division process will be the accumulation in counters CN10 and CN9 of the tens and units values representing the number of full block counts: in the assumed example (5,432 divided by 93), the number of full block counts will be 58—CN10 set to 5 and CN9 set to 8. The remainder or partial block count is dealt with as an approximation. If the partial count in CN6 and CN7 is less than 24, counter CN8 will be left at zero (58.0): if the partial count is greater than 23 but less than 64, counter CN8 is set to a count of five (58.5); and, if the partial count is greater than 63, one count is added into counter CN9 (59.0). These approximations are based on the fact that for dialing speeds in the range centered about a nominal telephone-dialing speed of 10 pulses per second, a partial count in counters CN6 and CN7 closely approximates the decimal part of the quotient (division process) expressed in hundredths—that is, 50 counts would be interpreted as 50/100 or 0.5. Since the test set is reading to the nearest 0.5 percent, the algorithm for obtaining the least significant digit of the answer becomes the above three logic decisions.

First Block Count

The block counting starts as soon as the 130-kHz. clock in FIG. 28 provides the first high clock pulse after the setting of the division flip-flop FF3. Gates G45 and G46 provide outputs which go high-to-low for each high clock pulse and go low-to-high for each low clock pulse. The output of G45 extends over lead 289 into FIG. 29 to the CP input to counter CN11. Counter CN11 will down-count one count for each low-to-high transition at its CP input: thus, counter CN11 will down-count one count at the leading edge of each low clock pulse (130 kHz. The output of G46 in FIG. 28 extends over lead 287 into FIG. 29 to the CP input to counter CN6. Counter CN6 will up-count one count for each high-to-low transition at its CP input: thus, counter CN6 will up-count one count at the leading edge of each high clock pulse (130 kHz.). Also, in FIG. 28, the output of G46 on lead 287 extends into FIG. 31, through I53, and over lead 288 into FIG. 32 to the left input to G53. The output of G53 will remain high until its right input is made high from CT4, at which time the leading edge of the next ensuing high clock pulse (130 kHz. in FIG. 28) will be effective through G46, lead 287 into FIG. 31, I53, lead 288 into FIG. 32, G53, and G85 to provide a high-to-low output from I55 for recycling the counters CN6 and CN7 of FIG. 29 and for inserting one block count into counter CN9 of FIG. 30, as will be described.

In FIG. 29, when counter CN11 has been down-counted two counts it will be at the count of zero (Q1 and Q8 low). When CN11 down-counts the next clock pulse, it will go from zero to nine (Q1 and Q9 high) to provide a low-to-high transition from its Q8 output over lead 301 into FIG. 30 to the CP input to counter CN12, to cause CN12 to down-count one count. Similarly, counter CN13 will down-count one count for each 10 down-counts in counter CN12; and, counter CN14 will down-count one count for each 10 down-counts in counter CN12; and, counter CN14 will down-count for each 10 down-counts in counter CN 13.

In FIG. 29, counter CN6 will up-count from zero to fifteen (Q1, Q2, Q4 and Q8 high), then to zero (Q1, Q2, Q4 and Q8 low), then to 1 to 2 to 3, etc. Each time the Q8 output of CN6 goes from low to high (on the change from the count of seven—Q8 low—to the count of eight—Q8 high), the high Q8 output is effective at once through G57, DEL7 and G58 as a low-to-high transition at the CP input to counter CN7. Each time the Q8 output of CN6 goes from high to low (in the change from the count of 15—Q8 high—to the count of zero—Q8 low), the high-to-low output transition is effective through G57, DEL 7 (after a delay of 0.3 μsec.), and G58 as a high-to-low transition at the CP input to CN7 delayed 0.3 μsec. Such a high-to-low transition at the CP input to CN7 up-counts CN7 one count for each 16 up-counts in CN6.

When counters CN6 and CN7 of FIG. 29 have up-counted to a count of 92, CN7 will be set on a count of five (Q1 and Q4 high —Q2 and Q8 low) and CN6 will be set on a count of 12 (Q4 and Q8 high—Q1 and Q2 low). At this time, the upper register of FIGS. 29 and 30 will have down-counted the same amount (92), thus leaving a count of (5,432 less 92) 5,340 in CN14, CN13, CN12 and CN11. The count (5) in CN7 of FIG. 29 is the same as the count (5) in CN5 of FIG. 32; thus, the output in FIG, 32 of each of gates G60, G61, G62 and G63 is high at the four lower inputs to collector tie CT4. The count (12) in CN6 of FIG. 29 is different from the count (13) in CN4 of FIG. 30, thus rendering the outputs in FIG. 32 of gates G49 G50, G51 and G52 respectively high, high, high and low. The low output of G52 holds low the output of CT3 which holds low the output of CT4 at the right input to G53.

The 93rd clock pulse (130kHz.) will reduce the count in the upper register of FIGS. 29 and 30 to 5,339 (CN14, CN13, CN12 and CN11) and will add one more count into CN6 of FIG. 29 to bring it count up to 13 (Q1, Q4 and Q8 high—Q2 low). The same clock pulse is effective through G46 of FIG. 28, over 5,339 287 into FIG. 31, I53, and lead 288 into FIG. 32 to render high the left input to G53. When counter CN6 of FIG. 29 advances to the count of 13, its Q1 output goes high to render high the output in FIG. 32 of G52: this allows the outputs of CT3 and CT4 to go high at the right input to G53 in FIG. 32. The resulting low output from G53 is effective through G85, I55 and SS12 to produce at the output of I55 a 2-μsec. low pulse on lead 322.

In FIG. 32, the 2-μsec. low pulse on lead 322 extends into FIG. 29 where it is effective through G55, DEL8 (after a delay of 0.3 μsec.), and G54 as a 1.7-μsec. low pulse at the CD inputs to CN6 and CN7. CN6 and CN7 are thereupon cleared to zero counts (Q1, Q2, Q4 and Q8 outputs low), which returns the output of CT4 in FIG. 32 to low at the right input to G53.

In FIG. 32, the 2- μsec. low pulse on lead 322 is effective through I56, lead 327 into FIG. 33, G59, lead 335 into FIG. 30, and through G65 to change the CP input to CN9 from low to high for 2 μsec. and then to allow the CP input to CN9 to return to low. At the end of the 2-μsec. pulse, the CP input to CN9 carries a high-to-low transition which adds one count into CN9 to set it to the count of one (Q1 high—Q2, Q4 and Q8 low).

The result of the first block count is to place one count in CN9 of FIG. 30 and to recycle to zero counts the counters CN6 and CN7 to FIG. 29, leaving the count in the upper register of FIGS. 29 and 30 at 5,339 (the starting break count of 5,432 less the count of 93, which represents one "block count").

Additional Block Counts

In the manner above described, the recycling counter (CN6 and CN7) of FIG. 29 repeatedly counts up to 93 and is thereupon reset to zero count. Each time the recycling counter is reset, one block count is added into counter CN9 in FIG. 30. Also, counter CN10 adds one count for every ten counts into counter CN9.

This process continues under the control of the 130-kHz. clock of FIG. 28 for 58 full block counts. This represents (58 ×93) 5,394 counts of the 130-kHz. clock, which will have reduced the count in the upper register a total of 5,394 counts from its starting count of 5,432, leaving the count of 0,038 in counters CN14, CN13, CN12 and CN11 of FIGS. 29 and 20 and leaving the count of 58 in counters CN10 and CN9 of FIG. 30.

With only 38 counts remaining in the upper register after the 58th full block count, the 130-kHz. clock will reduce that count of 38 to zero on the next 38 clock pulses. In the meantime, the count in the recycling counter (CN6 and CN7) will have added up to 38. Under these conditions, the following circumstances prevail:

1. the block count of 58 is registered in counters CN10 and CN9 of FIG. 30—CN10 set to 5 (Q1 and Q4 high—Q2 and Q8 low)—counter CN9 set to 8 (Q8 high—Q1, Q2 and Q4 low);

2. the recycling count of 38 is registered in counters CN6 and CN7 of FIG. 29—CN6 set to 6 (Q2 and Q4 high—Q1 and Q8 low)—CN7 set to 2 (Q2 high—Q1, Q4 and Q8 low); and, 3. the period count of 93 is still registered in counters CN4 and CN5 of FIG. 32—CN4 set to 13 (Q1, Q4 and Q8 high—Q2 low)—CN5 set to 5 (Q1 and Q4 high—Q2 and Q8 low).

End of Full Block Counting

With the above-mentioned circumstances prevailing the leading edge of the next low 130-kHz. clock pulse will be effective at he CP input to counter CN11 of FIG. 29 to set each of the counters CN11, CN12 CN13 and CN14 of FIGS. 29 and 30 from the count of zero to the count of nine, leaving the count of 9,999 in the upper register. When counter CN14 of FIG. 30 changes from the count of zero to the count of nine, its A output provides a 1-μsec. high pulse at the CP input to the carry flip-flop FF2, the high-to-low transition at the trailing edge of which thereupon clears FF2 (Q goes from high to low—$\overline{Q}$ goes from low to high).

The recycling count of 38 in counters CN6 and CN7 will not change until and unless the next ensuing high clock pulse (130-kHz.) is allowed to pass through G46 of FIG. 28. The low clock pulse (130-kHz.), which causes FF2 of FIG. 30 to be cleared, lasts for a period of some 4 to 5 μsec. before the next ensuing high clock pulse occurs, In the meantime, the low Q output of FF2 in FIG. 30 extends over lead 303 through FIG. 29 into FIG. 28 to the D input to FF3 and to he middle input to G46. The output of G46 is thus kept high to prevent any further 130-kHz. clock pulses from passing through G46 to lead 287 into FIGS. 29 and 31. In FIG. 29, the high on lead 287 keeps high the CP input to CN6 to prevent the adding of any more counts to the 38 counts presently registered in CN6 and CN7. In FIG. 31, the high on lead 287 is effective through I53, lead 288 into FIG. 32, and G53 to hold high the output of G53 regardless of what happens at the right input to G53.

Also, the high $\overline{Q}$ output of FF2 in FIG. 30 extends over lead 302 into FIG. 29 to the upper input to G74. Since counter CN11 of FIG. 29 is set at nine (Q1 and Q8 high), the output of G74 will go low on lead 316 into FIGS. 28 and 31. In FIG. 28, the low on lead 316 is effective through G39 as a low-to-high transition at the CP input to FF3, which thereupon will make its Q output the same (low) as its D input (Q low—$\overline{Q}$ high). In FIG. 31, the low on lead 316 is effective through G47 and G48 as a low on lead 317 into FIG. 32 to the CD inputs to counters CN4 and CN5. In FIG. 32, the low at the CD inputs to CN4 and CN5 clears these counters to zero count (Q1, Q2, Q4 and Q8 outputs low). This renders high the output of collector tie CT3 and the output of collector tie CT4 at the right input to G53. In FIG. 28, the low Q output of the cleared division flip-flop FF3 extends to the left input to G45 and to the right input to G46 to hold the outputs of these 130-kHz. clock gates high on respective leads 289 and 287. Also, the low Q output of FF3 extends over lead 293 into FIG. 29 to hold the output of G57 high. In FIG. 28, the high $\overline{Q}$ output of FF3 extends to the D input to the input flip-flop FF1 and is effective through G56 as a low on lead 286 into FIG. 29 to hold high the output of G58 at the CP input to CN7. Also, the high $\overline{Q}$ output of FF3 in FIG. 28 extends over lead 314 through FIGS. 31 and 32 into FIG. 33 to the lower input to G64 and to the input to I57.

The significant logic level changes as a result of the clearing of the division flip-flop FF3 (Q from high to low—$\overline{Q}$ from low to high) in FIG. 28 are:

1. in FIG. 28, G44 produces a high-to-low transition on lead 315 into FIGS. 29 and 31 at the inputs to SS8 and SS9 of FIG. 29 and to DELSS2 in FIG. 31; and, 2. in FIG. 33, I57 produces a high-to-low transition at the input of SS13.

As will be discussed in the next two sections, the high-to-low transition from I57 in FIG. 33 provides a 2-μsec. interval during which the partial block count remaining in counters CN6 and CN7 of FIG. 29 is taken into account; and, the high-to-low transition from G44 in FIG. 28 provides a 12-μsec. interval during which (1) the count in the lower register (CN8, CN9 and CN10) of FIGS. 29 and 30 is transferred to the upper register (CN12, CN13 and CN14) of FIGS. 29 and 30 for display of the answer and (2) the counters CN6 through CN10 of FIGS. 29 and 30 are cleared.

Block Count Remainder

The partial block count, if any, remaining in counters CN6 and CN7 of FIG. 29 is taken into account through the use of gates G66 through G73 of FIG. 33. When the division flip-flop FF3 of FIG. 28 is cleared (Q low - $\overline{Q}$ high) at the time the down-counting in the upper register (CN11, CN12, CN13 and CN14) of FIGS. 29 and 30 went from 0000 to 9,999, as above discussed, I57 in FIG. 33 produces a high-to-low output transition at the input to SS13: SS13 thereupon produces a 2-μsec. low output pulse which is effective through I58 as a 2-μsec. high at the lower input to G68 and at the middle input to G70. This 2-μsec. pulse is used to sense the order of magnitude of the partial count in CN6 and CN7 of FIG. 29 and to either (1) add nothing to the count in CN8 and CN9 and CN10 or (2) set CN8 to a count of 5 or (3) add one count into CN9, depending upon whether the partial count in CN6 and CN7 is respectively (1) less than 24 or (2) from 24 to 63 inclusive or (3) is greater than 63.

The gates G66 through G73 of FIG. 33 are so arranged with respect to the outputs of counters CN6 and CN7 of FIG. 29 such that the following results will prevail during the 2-μsec. high output pulse from I58 of FIG. 33:

1. if CN6 and CN7 contain a count of less than 24, nothing will be done to the existing block count in CN10, CN9 and CN8 of FIG. 30;

2. if CN6 and CN7 contain any count of 24 to 63 inclusive, gate G71 in FIG. 33 will provide an output pulse for setting CN8 of FIG. 30 to a count of five (as an indication of a half of a block count); and, 3. if CN6 and CN7 contain a count greater than 63, gate G72 in FIG. 33 will provide an output pulse for adding one more count into the units block count counter CN9 of FIG. 30.

In FIG. 29, the Q8 output of CN6 is connected over lead 298 through FIG. 30 and into FIG. 33 to the upper input to G67, the Q1 output of CN7 is connected over lead 299 through FIG. 30 and into FIG. 33 to the lower input to G67 (and to the right input to G81—used only during the speed measurement to be described later), the inverse of the Q2 output of CN7 is connected from the output of I46 over lead 324 through FIG. 32 into FIG. 33 to the lower input to G69, the inverse of the Q4 output of CN7 is connected from the output of I47 over lead 326 through FIG. 32 into FIG. 33 to the lower input to G66, and the inverse of the Q8 output of CN7 is connected from the output of I48 over lead 325 through FIG. 32 and into FIG. 33 to the upper input to G66.

If the count in CN6 and CN7 of FIG. 29 is less than 24, (1) CN7 must contain a count of zero (0) or one (16); and (2) if CN7 contains a count of one (16) then CN6 must contain a count of seven or less. Under (1) above, both of outputs Q4 and Q8 of CN7 will be low to become effective through I47 and I48 as highs on leads 326 and 325 into FIG. 33 to the two inputs to G66, whose resulting low output holds high the output of G68, which holds low the output of I65, which holds high the output of G72. Under (2) above, the Q1 output of CN7 will be high on lead 299 into FIG. 33 to the lower input to G67, the Q8 output of CN6 will be low on lead 298 into FIG. 33 to the upper input to G67, the high output of G67 holds high the upper input to G69, the low Q2 output of CN7 will be effective through I46 as a high on lead 324 into FIG. 33 to the lower input to G69, and the low input of G69 holds high the output of G70, which holds low the output of I64, which holds high the output of G71. Since the outputs of G71 and G72 are held high, no change is made in the content in FIG. 30 of counters CN10, CN9 and CN8.

If the count in CN6 and CN7 of FIG. 29 is anything from 24 to 63, inclusive, CN7 must contain a count of one or two or three (with its Q4 and Q8 outputs low) and one of two other situations must prevail:

1. any count of 24 to 31, inclusive, will find the Q2 output of CN7 low, the Q8 output of CN6 high, and the Q1 output of CN7 high;

2. and, any count of 32 to 63, inclusive, will find the Q2 output of CN7 high.

The low Q4 and Q8 outputs of CN7 are effective through I47 and I48 as highs on leads 326 and 325 into FIG. 33 at the two inputs of G66, whose low output holds high the output of G68, to in turn disable G72 through I65 by holding high the output of G72, thus to prevent G72 from high the count in counters CN10, CN9 and CN8 of FIG. 30. Under (1) above, the low Q2 output of CN7 is effective through I46 as a high on lead 324 into FIG. 33 at the lower input of G69, the high Q8 output of CN6 on lead 298 into FIG. 33 appears at the upper input to G67, and the high Q1 output of CN7 appears on lead 299 in FIG. 33 at the lower input to G67, whose output is thus low at the upper input to G69. The high output of G69 renders high the upper input to G70 and the high output of I73 renders high the lower input to G70. The 2-μsec. high pulse (from I58 in FIG. 33) is effective through G70, I64 and G71 to provide on lead 334 a 2-μsec. low pulse. The 2-μsec. low pulse on lead 334 extends into FIG. 30 to the SD4 input to counter CN8; and, the 2-μsec. low pulse on lead 334 in FIG. 33 is effective through G73 and I66 as a 2-μsec. low pulse on lead 333 into FIG. 30 to the SD1 input to counter CN8. Since CN8 is cleared to zero count and since its CD input is held high on lead 311, the 2-=sec. low pulses on its SD1 and SD4 inputs will set those cells to their one states so as to set CN8 to a count of five (Q1 and Q4 high-Q2 and Q8 low). Under (2) above, the high Q2 output of CN7 is effective through I46 as a low on lead 324 into FIG. 33 at the lower input to G69, whose resulting high output enables G70 to pass the 2-μsec. high pulse on its middle input, thus, as above discussed, to cause G71 to produce a 2-μsec. low pulse on lead 334 to set counter CN8 of FIG. 30 to the count of five.

If the count in CN6 and CN7 of FIG. 29 is anything from 64 through 158 (maximum possible remainder), one or the other of the Q4 and Q8 outputs of CN7 will be high so as to be effective through I47 or I48 on lead 326 or 325 into FIG. 33 to one or the other input of G66, whose high output at the upper input to G68 allows the 2-μsec. high pulse at the lower input to G68 to be effective through G68, I65 and G72 as a 2-μsec. low output from G72 on lead 332. The high output of G66 renders low the output of I73. The 2-μsec. low pulse on lead 332 in FIG. 33 extends into FIG. 30 where it is effective through G65 to apply a 2-μsec. high pulse at the CP input to CN9. At the end of the 2-μsec. high at the CP input to CN9, the high-to-low transition (as the output of G65 returns to low) will add one count into CN9. In the meantime, the low output of I73 in FIG. 33 at the lower input to G70 disables G70 by holding its output high.

Under the assumed test conditions, it will be recalled that at the end of that part of the division process concerned with the registering of the full block count in counters CN10 and CN9 of FIG. 30, 58 full block counts were counted in CN10 (set to a count of five) and CN9 (set to a count of eight): also, the recycling counter (CN6 and CN7) of FIG. 29 contained a remainder count of 38 (CN7 set at 2 and CN6 set at 6). From the above, it will be recalled that for a remainder count in CN6 and CN7 of anything from 24 to 63, inclusive, counter CN8 is set to a count of 5. This will cause counters CN10, CN9 and CN8 to contain a block count of 58.5.

At the end of the 2-μsec. interval from SS13 in FIG. 33, the output of SS13 returns to high to return to low the output of I58 at the lower input to G83, at the lower input to G68, and at the middle input to G70. The outputs of G71 and G72 either return to high or stay there.

Transfer and Clearing Operations

At the time that the division flip-flop FF3 of FIG. 28 is cleared, as above described, the low-to-high transition at its $\overline{Q}$ output is effective through G44 as a high-to-low transition on lead 315 into FIG. 29 at the inputs to SS8 and SS9. The high-to-low transition on lead 315 also extends into FIG. 31 to the input to DELSS2. In FIG. 31, DELSS2 produces a 2-μsec. low output pulse after a delay of 10-μsec.; in FIG. 29, SS9 produces a 10-μsec. low output, which is effective at the output of G8 as a 10-μsec. high pulse input to DEL5; and, in FIG. 29, SS8 produces a 5-μsec. low pulse output which is effective through G10 and I20 as a 5-μsec. low pulse on lead 291 in FIGS. 29 and 30. The 5-μsec. low pulse on lead 291 in FIG. 30 is effective through G30 and I36 to hold low for 5 -μsec. the K input to the carry flip-flop FF2 so that FF2 cannot change state for at least 5 -μsec. In FIG. 29, the 5-μsec. low on lead 291 appears at the upper input to G14 to hold high the output of G14 until the end of the 5-μsec. interval. The 10-μsec. high pulse from G8 is delayed 0.3 -μsec. in DEL5 and then renders the lower input to G14 high for 9.7 -μsec. (the rest of the 10-μsec. interval). The output of G14 will thus remain high until the end of the 5-μsec. low interval on its upper input and will then become low for 5 -μsec.

In FIG. 29, the 5 -μsec. low pulse from I20 is effective through I21, DEL6 (after a delay of 0.6 -μsec.), and G15 as a 4.4-μsec. low pulse (the last 4.4-μsec. of the 5-μsec. interval from I20) on the preset lead 290 in FIGS. 29 and 30 at the PS inputs to counters CN11, CN12, CN13 and CN14 of the upper register. The 4.4-μsec. low pulse on lead 290 sets each of the counters CN11, CN12, CN13 and CN14 to its maximum count of 15 (Q1, Q2, Q4 and Q8 high). At the end of the 5-μsec. interval from SS8 in FIG. 29, the output of SS8 returns to high, the output of G10 returns to low, and the output of I20 on lead 291 in FIGS. 29 and 30 returns to high. In FIG. 30, the return to high on lead 291 is effective through G30 and I36 to return to high the K input to FF2. In FIG. 29, the return to high on lead 291 is effective at once through I21, DEL6 and G15 to return to high the preset lead 290 in FIGS. 29 and 30 at the PS input to the counters CN11, CN12, CN13 and CN14.

In FIG. 29, at the end of the first 5-μsec. when the output of I20 returns to high, the output of G14 goes low for the next 5-μsec. at the input to SS10. SS10 thereupon provides a 2-μsec. low output pulse which is effective through G16 as a 2-μsec. high pulse on the transfer lead 292 in FIGS. 29 and 30. In FIG. 30, the 2-μsec. high pulse on lead 292 is effective through I35 as a 2-μsec. low pulse at the SD input to FF2, which thereupon becomes set (Q high—$\overline{Q}$ low). The high Q output of FF2 extends over lead 303, through FIG. 29, into FIG. 28, to the middle input to G46 and to the D input to FF3. In FIG. 30, the low $\overline{Q}$ output of FF2 extends over lead 302 into FIG. 29 to the upper input to G74, whose output thereupon goes high on lead 316 into FIGS. 28 and 31. In FIG. 28, the high on lead 316 is effective through G39 to render low the CP input to FF3. In FIG. 31, the high on lead 316 is effective though G47 and G48 to return lead 317 into FIG. 32 to high at the CD inputs to CN4 and CN5.

In the meantime, in FIGS. 29 and 30, the 2-μsec. high pulse on the transfer lead 292 causes the transfer into the upper register of the count then existing in the lower register, as discussed previously in connection with the transfer gates G75 through G78 of FIG. 29 and G18 through G29 of FIG. 30. Specifically, the 2 registered in CN7 is transferred to CN11 as a count of 2 (Q2 high—Q1, Q4 and Q8 low); the 5 registered in CN8 is transferred to CN12 as a count of 5 (Q1 and Q4 high—Q2 and Q8 low); the 8 in CN9 is transferred as a count of 8 into CN13 (Q8 high—Q1, Q2 and Q4 low); and, the 5 in CN10 is transferred as a count of 5 into CN14 (Q1 and Q4 high—Q2 and Q8 low). The upper register thus contains the four counts of 5,862 in CN14, CN13, CN12 and CN11. The count of 2 is disregarded since only CN12, CN13, and CN14 are connected to the readout and display circuits NX1, NX2 and NX3.

At the end of the 2-μsec. interval from SS10 in FIG. 29, the output of SS10 returns to high and the output of G16 returns to low on the transfer lead 292 in FIGS. 29 and 30, thus to disable the transfer gates G75 through G78 (FIG. 29) and G18 through G29 (FIG. 30), and to return to high the SD input to FF2 in FIG. 30. At the end of the 10-μsec. interval from SS9 in FIG. 29, the output of SS9 returns to high, the outputs of G8 and DEL5 return at once to low, and the output of G14 returns to high at the input to SS10.

Just as the 10-μsec. interval from SS9 of FIG. 29 ends, the delayed single shot DELSS2 in FIG. 31 provides a 2-μsec. low output pulse (delayed 10 μsec. from the low-to-high transition at the $\overline{Q}$ output in FIG. 28 of FF3). In FIG. 31, the 2-μsec. low from DELSS2 is effective through G42, I51, G40 and G41 as a 2-μsec. low pulse on lead 311 into FIGS. 28, 29 and 30. In FIG. 30, the 2-μsec. low on lead 311 appears at the CD inputs to counters CN8, CN9 and CN10, which thereupon are cleared to zero count (all Q1, Q2, Q4 and Q8 outputs low). In FIG. 29, the 2-μsec. low pulse on lead 311 appears at the lower input to G55 where it is effective through G55, DEL8 (after a 0.3-μsec. delay), and G54 as a 1.7-μsec. low pulse at the CD inputs to counters CN6 and CN7, which thereupon are cleared to zero count (all Q1, Q2, Q4 and Q8 outputs low). At the end of the 2-μsec. low pulse from DELSS2 in FIG. 31, the output of DELSS2 returns to high, the output of G42 returns to low, the output of I51 returns to high, the output of G40 returns to low, and the output of G41 returns to high on lead 311 into FIGS. 28, 29 and 30. In FIG. 30, the return to high on lead 311 returns to high the CD inputs to the cleared counters CN8, CN9 and CN10. In FIG. 29, the return to high on lead 311 returns to low the output of G55, which is effective at once through DEL8 and G54 to return to high the CD inputs to the cleared counters CN6 and CN7.

SUMMARY OF TRANSFER AND CLEARING

From the above, the following is the status of the circuit at the end of the transfer and clearing operations pursuant to the assumed example of dividing the 5,432 10.-kHz. break count by the 93 100.-Hz. period count (which arithmetically comes out to a % BK of 58.41):

1. in FIG. 30, counters CN14, CN13 and CN12 contain the counts of 5, 8 and 5;

2. in FIG. 30, readout circuits NX3, NX2 and NX1 are displaying the answer as 58.5% BK (the decimal point lamp DECPT is lit and physically located between NX2 and NX1;

3. in FIG. 30, the carry flip-flop FF2 is in a set condition (Q high —$\overline{Q}$ low);

4. in FIG. 29, counter CN11 is set to a count of two (Q2 high, Q1, Q4 and Q8 low), which is of no consequence;

5. in FIGS. 29 and 30, counters CN6, CN7, CN8, CN9 and CN10 are cleared to zero count (all Q1, Q2, Q4 and Q8 outputs low);

6. in FIG. 32, each of counters CN4 and CN5 is cleared to zero count (Q1, Q2, Q4 and Q8 low);

7. in FIG. 28, the input flip-flop FF1 is in the cleared condition (Q low—$\overline{Q}$ high) with its D input high;

8. in FIG. 28, the division flip-flop FF3 is in the cleared condition (Q low—$\overline{Q}$ high) with its D input high;

9. in FIG. 28, the counter CN1 is set and held at the starting count of nine (A and D high);

10. in FIG. 28, the 130.-kHz. clock is blocked by the disabled gates G45 and G46;

11. in FIG. 31, each of counters CN2 and CN3 is set and held at its starting count of nine (C output low);

12. in FIG. 31, the steady low C output of CN3 represents the lack of a 100.-Hz. clock source; and, 13. in FIG. 31, the 10.-Hz. clock is blocked by the disabled gate G38.

The circuit is in a normalized (or initialized or cleared) condition such that as soon as the DIAL PULSE INPUT of FIG. 28 provides another series of high and low, break and make intervals of a series of dial pulses, the process of accumulating data for a new computation can commence.

MEASURING DIALING SPEED

In order to use the circuit of FIGS. 28 through 33 to measure pulsing speed in pulses per second (pps) instead of to measure percent break (% BK), the F2 switch is operated and the F3 switch is released. This closes contacts F2–1 through F2–7 and opens contacts F3–through F3–7 of FIGS. 30, 31 and 33.

The approach to the PPS operation is essentially the same as in the % BK operation except for the following:

1. prior to reading-in the 100.-Hz. clock data for the nine pulse periods, the lower register of FIGS. 29 and 30 is preset to a count of 9,000—CN10 (9) and CN9, CN8 and CN7 (0);

2. the 10.-kHz. clock is prevented from changing the 9,000 in the lower register while the 100.-Hz. clock is counted in the period counter (CN4 and CN5) of FIG. 32;

3.) at the end of the data accumulation phase, as in the case of % BK, the 9,000 is transferred to the upper register of FIGS. 29 and 30;

4. in FIG. 30, the block counts are inserted into CN8 instead of into CN9 as in % BK; and, 5. the remainder, if any, in the recycling counter (CN6 and CN7 of FIG. 29) is used to add one count into CN8 of FIG. 30 if the partial count is 48 or more.

Upon the completion of the division phase (9,000 divided by the period count in CN4 and CN5 of FIG. 32), the upper register of FIG. 30 will allow the decoder and display circuits NX3, NX2 and NX1 of FIG. 30 to visually display the answer as tens, units and tenths of pps, such as 09.6 pps or 10.8 pps, etc.; the decimal point lamp DECPT of FIG. 30 is lit by closed contact F2–2 and is physically located between NX2 and NX1 in FIG. 30.

In FIG. 31, G42 provides at its output, as will be recalled from the % BK description, a 2-μsec. high pulse during the clearing operation, either as the result of a high-to-low transition at the input to SS6 or as the result of a 2-μsec. low pulse from DELSS2. The 2-μsec. low pulse from G42 in FIG. 31 is effective through I51, G40 and G41, as above described, as a 2-μsec. low pulse on lead 311 into FIGS. 28, 29 and 30 to clear the counters CN6 through CN10 of FIGS. 29 and 30 to zero count. However, in FIG. 31, the 2-μsec. high pulse from G42 is effective through I67, DEL3 (at once), I68, I69, lead 310 through FIG. 32, into FIG. 33, through closed contact F2–3, G80, lead 330 into FIG. 30, and I70 as a 2-μsec. low pulse at the SD1 and SD8 inputs to CN10. This 2-μsec. low pulse at the SD1 and SD8 inputs to CN10 sets the 1 and 8 cells of CN10 to their one states (Q1 and Q8 high) while the 2 and 4 cells are being cleared to their zero states (Q2 and Q4 low) by the low clearing pulse at the CD input to CN11. Thus, counters CN6 and CN7 of FIG. 29 will be set to zero counts and counters CN8 and CN9 of FIG. 30 will be set to zero counts; but, counter CN10 of FIG. 30 will be set to a count of nine (Q1 and Q8 high—Q2 and Q4 low). The result of each such "clearing" operation is to preset the lower register to a count of 9,000—CN10 (9), CN9 (0) and CN7 (0).

In FIG. 31, closed contact F2–1 holds the output of G37 high and the output of I49 low at the upper input to the 10-kHz. gate G38. Thus, G38 does not pass 10.-kHz. clock pulses over lead 312 into FIG. 28 to G56; and, G56 thus does not repeat the 10-kHz. clock pulses over lead 286 into FIG. 29 to gate G58 feeding the CP input to CN7. In the % BK operation, it will be recalled, the CP input to CN7 in FIG. 29 was fed with the 10.-Hz. clock pulses during the sum of the nine break intervals in order to accumulate a break count in the lower register (CN7 through CN10) of FIGS. 29 and 30. In the pps operation, the above preset value of 9,000 in the lower register is used later in the division phase instead of the accumulated break count as in % BK.

In FIG. 33, the left input to G79 is made high through contact F2–6 and the lower input to G59 is held low through contact F2–5. The output of G59 is thus held high and G79 is enabled to pass high pulses at its right input. The right input to G79 is normally low on lead 327 from FIG. 32 through I56 from the normally high output of I55. The output of G79 is thus normally high at the middle input to collector tie CT5 in FIG. 33. Also in FIG. 33, the lower input to G84 is made high through contact F2–4, thus enabling G84 to pass high pulses at its upper input. The output of G84 is normally high at the right input to CT5. Also, the left input to CT5 is normally high from the output of G64, whose upper input is held low on lead 320 from FIG. 32, through I63 from the normally high output of SS11. The output of collector tie CT5 in FIG. 33 is thus normally high on lead 331 into FIG. 30 at the CP input to CN8.

In FIG. 32, during the division phase, as previously discussed, I55 will provide a 2-μsec. low pulse on lead 322 at the input to I56 each time the recycling counter (CN6 and CN7) of FIG. 29 arrives at one block count (i.e., the same count as in the period counter—CN4 and CN5 of FIG. 32). Such a 2-μsec. low pulse on lead 322, as previously described, appears in FIG. 29 at the upper input to G55 to clear each of the counters CN6 and CN7 to zero count for counting the next block count. The 2-μsec. low pulse in FIG. 32 at the input to I56 is effective through I56 as a 2-μsec. high pulse on lead 327 into FIG. 33 at the right input to G79. The resulting 2-μsec. low pulse output of G79 renders low the middle input to CT5 and the output of CT5 on lead 331 into FIG. 30. In FIG. 30, the 2-μsec. low pulse on lead 311 appears as a high-to-low transition at the CP input to the then-cleared CN8 to insert one count into CN8. Each time CN8 goes from the count of nine (Q8 high) to the count of zero (Q8 low), its Q8 output provides a high-to-low transition, which is effective through I26 as a low-to-high transition at the left input to G65. G65 thereupon provides a high-to-low output transition at the CP input to the cleared counter CN9 to insert one count therein. Likewise, the Q8 output of CN9 adds one count into the cleared counter CN10 for each ten counts in CN9.

As an example, assume that the input pulsing speed (pps) is a nominal 10 pps. The nine pulse periods counted in the 100 Hz. period counter (CN4 and CN5) of FIG. 32 will come to 90 counts at 100 Hz. When the preset value of 9,000 in the upper register of FIGS. 29 and 30 is divided by the 90 counts in the period counter (CN4 and CN5) of FIG. 32, the answer of 100 will appear in counters CN10 (1), CN9 (0) and CN8 (0) of FIG. 30. Subsequently, as in % BK, the count of 100 is transferred from counters CN8, CN9 and CN10 in FIG. 30 into counters CN12, CN13 and CN14 so that the displays NX3, NX2 and NX1 can show the three numerals 100 as a speed of 10.0 pps.

Of course, the pulsing speed may not produce exactly 90 counts at 100 Hz. in the period counter (CN4 and CN5) of FIG. 32. As a consequence, the block count may not be exactly 100: it might be more or less for respective speeds slower or faster than 10 pps. Under such circumstances, the recycling counter (CN6 and CN7) of FIG. 29 may contain some partial block count. An approximation is made to the effect that if the partial count is 48 or more, one more count (a tenth of a pps) should be added into counter CN8 of FIG. 30. As in the % BK operation, the partial count is "looked at" by the 2-μsec. high pulse output of I58 in FIG. 33. In FIG. 33, the outputs of G71 and G72 are held high by their lower inputs being held low to ground over contact F2–7, instead of high over contact F3–7 as in % BK. Thus, G71 and G72 cannot affect the condition of counters CN8 and CN9 of FIG. 30.

If the partial count in CN6 and CN7 of FIG. 29 is anything from 48 through 63, CN7 will be set at a count of three (3 times 16 equals 48 and 4 times 16 equals 64) with its Q1 and Q2 outputs high sec. low its Q4 and Q8 outputs low. The high Q1 and Q2 outputs of CN7 extend sec. low lead 299 and 300, through FIG. 30, and into FIG. 33 to the two inputs to G81, whose resulting low output extends to the upper input to G82 to produce a high at the upper input to G83. The 2-μsec. high pulse from I58 in FIG. 33 is thus effective through G83, I71 and G84 as a 2-μsec./low pulse at the right input to CT5, whose output is thus a 2-μsec./low pulse on lead 331 into FIG. 30 at the CP input to CN8 to add one count therein.

If the partial count in CN6 and CN7 is less than 48, CN7 will be set to a count of two (Q2 high—Q1, Q4 and Q8 low) or a count of one (Q1 high—Q2, Q4 and Q8 low) or a count of zero (Q1, Q2, Q4 and Q8 low). One or both of the Q1 and Q2 outputs of CN7 will be low on leads 299 and 300 into FIG. 33 to the inputs to G81: the output of G81 will thus be high at the upper input to G82. Also, in FIG. 29, the Q4 and Q8 outputs of CN7 will be low to make high the outputs of I47 and I48 on leads 326 and 325 through FIG. 30 and into FIG. 33 to the two inputs to G66. The output of G66 will thus be low at the upper input to G68 to hold high the output of G68 at the lower input to G82. The resulting low output of G68 at the lower input to G82. The resulting low output from G82 at the upper input to G83 disables G83 by holding high its output at the input of I71. The 1-μsec. high pulse from I58 in FIG. 33 is blocked by G83 to preclude any additional count being placed into CN8 of FIG. 29.

If the partial count in CN6 and CN7 of FIG. 29 is more than 63, CN7 must be set as a count of 4, 5, 6, 7, 8 or 9. This means that one of the Q4 and Q8 outputs of CN7 will be high and the other one will be low so as to render a high and a low on the pair of leads 325 and 326 extending from I47 and I48 in FIG. 29 through FIG. 30 into FIG. 33 to the two inputs to G66. The output of G66 will then be high at the upper input to G68. When the 2-μsec. high pulse from I58 is applied to the lower input to G68, the output of G68 will provide a 2-μsec. low pulse at lower input to G82, whose output thus is made high for at least the 2-μsec. interval at the upper input to G83. The 2-μsec. high pulse from I58 is also applied to the lower input to G83, whose output thus is made low for at least 2-μsec. The low output of G83 is effective through I71, G84 and CT5 as a low pulse on lead 331 into FIG. 30 at the CP input to CN8 to add one more count therein.

As in the % BK operation, after the partial count, if any, in CN6 and CN7 of FIG. 29 is taken into account, the answer in CN10, CN9 and CN8 of FIG. 30 is transferred into CN14, CN13 and CN12 of FIG. 30, the carry flip-flop FF2 of FIG. 30 is set (Q high—$\overline{Q}$ low), and the counters CN6 through CN10 of FIGS. 29 and 30 are preset to a count of 9,000 preparatory to making another speed measurement if desired. The circuit is in the CLEAR/START condition such that if the DIAL PULSE INPUT of FIG. 28 provides another series of make-break pulses, another measurement of speed will be made over a series of nine pulse periods.

It is to be understood that the above-described arrangement is illustrative of the application of the principles of the invention. Numerous other arrangements may be devised by those skilled in the art without departing from the spirit and scope of the invention.

What is claimed is:

1. Circuitry for measuring the average time interval between alternate consecutive pairs of signals among an odd series of such signals in terms of a percentage of the average time period between consecutive odd signals comprising:

A. a first pulse count register;

B. a second pulse count register;

C. a first source of pulses recurring at a constant frequency substantially greater then the recurrence frequency of consecutive signals of a pair;

D. means controlled by the first and last signals of the series for causing the second register to register a pulse count of the number of pulses from the first source occurring during the sum of all time periods between the first and last signals;

E. a second source of pulses recurring at a constant frequency an integral multiple of ten times the recurrence frequency of pulses from the first source;

F. means controlled by alternate consecutive pairs of signals for causing the first register to register a pulse count of the number of pulses from the second source occurring during the sum of all time intervals between the signals of the alternate pairs;

G. means controlled by the last signal of the series for causing the pulse count in the second register to be repeatedly and dissipatively subtracted from the pulse count in the first register so as to dissipatively reduce the pulse count in the first register;

H. and, means controlled by the subtracting means for indicating the number of subtractions required to cause the pulse count in the first register to be completely dissipated.

2. Circuitry for measuring the average time interval between alternate consecutive pairs of signals among an odd series of such signals in terms of a percentage of the average time period between consecutive odd signals comprising:

A. a first pulse count register;

B. a second pulse count register;

C. a first source of pulses recurring at a constant frequency substantially greater than the recurrence frequency of consecutive signals of a pair;

D. means controlled by the first and last signals of the series for causing the second register to register a pulse count of the number of pulses from the first source occurring during the sum of all time periods between the first and last signals;

E. a second source of pulses recurring at a constant frequency an integral multiple of 10 times the recurrence frequency of pulses from the first source;

F. means controlled by alternate consecutive pairs of signals for causing the first register to register a pulse count of the number of pulses from the second source occurring during the sum of all time intervals between the signals of the alternate pairs;

G. means controlled by the last signal of the series for causing the pulse count in the second register to be repeatedly and dissipatively subtracted from the pulse count in the first register so at to dissipatively reduce the pulse count in the first register,
subtracting means comprising
   1. a source of control pulses,
   2. a resettable dividing counter,
   3. means controlled by the last signal of the series
      a. for causing the dividing counter to count control pulses
      b. and for causing each counted control pulse to subtract one pulse count from the pulse count in the first register,
   4. and means controlled jointly by the dividing counter and by the second register for causing the dividing counter to be reset to zero count whenever the count in the dividing counter equals the count in the second register;

H. and, means controlled by the subtracting means for indicating the number of times the dividing counter is reset.

3. The invention defined in claim 2 wherein:

A. the first register comprises a down counter controllable to change its registration from zero count to maximum count upon the subtraction of one pulse count from zero count;

B. and, the means for causing control pulse counting in the dividing counter and control pulse subtracting in the down counter comprises means controlled by the down counter for allowing the counting and subtracting of control pulses until the count in the down counter changes from zero count to maximum count.

4. The invention defined in claim 3 wherein the allowing means comprises:

A. gating means interconnecting the source of control pulses with the dividing counter and with the down counter;

B. and, means controlled by the down counter for controlling the gating means so that control pulses are allowed to pass through the gating means to the dividing counter and to the down counter until the count in the down counter changes from zero count to maximum count.

5. The invention defined in claim 4 wherein the means for controlling the gating means comprises:

A. means controlled by the down counter for providing a stop signal when the count in the down counter changes from zero count to maximum count;

B. and means for applying the stop signal to the gating means to stop further control pulses from passing through the gating means to the dividing counter and to the down counter.

6. Circuitry for measuring the average time interval between alternate consecutive pairs of signals among an odd series of such signals in terms of a percentage of the average time period between consecutive odd signals comprising:

A. a pulse up counter;

B. a pulse down counter;

C. a pulse count register;

D. a first source of pulses recurring at a constant frequency substantially greater than the recurrence frequency of consecutive signals of a pair;

E. means controlled by the first and last signals of the series for causing the register to register a pulse count of the number of pulses from the first source occurring during the sum of all time periods between the first and last signals;

F. a second source of pulses recurring at a constant frequency an integral multiple of 10 times the recurrence frequency of pulses from the first source;

G. means controlled by alternate consecutive pairs of signals
   1. for causing the up counter to register a pulse count of the number of pulses from the second source occurring during the sum of all time intervals between the signals of he alternate pairs and
   2. for transferring the pulse count from the up counter to the down counter;

H. means controlled by the last signal of the series for causing the pulse count in the register to be repeatedly and dissipatively subtracted from the pulse count in the down counter I. and, means controlled by the subtracting means for indicating the number of subtractions required to cause the pulse count in the down counter to be completely dissipated.

7. The invention defined in claim 6 wherein:

A. the up counter is resettable;

B. the subtracting means comprises
   1. a source of control pulses,
   2. a resettable dividing counter,
   3. means controlled by the last signal of the series
      a. for resetting the up counter to zero count
      b. and for causing the dividing counter to count control pulses c. and for causing each counted control pulse to subtract one pulse count from the pulse count in the down counter, 4. and means controlled jointly by the dividing counter and by the register for causing the dividing counter to be reset to zero count whenever the count in the dividing counter equals the count in the register;

B. and, the indicating means comprises 1. the reset up counter 2. and means controlled by the dividing means for causing the reset up counter to contain a registration indicative of the number of times the dividing counter is reset.

8. The invention defined in claim 7 wherein:

A. the down counter is controllable to change its registration from zero count to maximum count upon the subtraction of one pulse count from zero count;

B. and, the means for causing control pulse counting in the dividing counter and control pulse subtracting in the down counter comprises means controlled by the down counter for allowing the counting and subtracting of control pulses until the count in the downcounter changes from zero count to maximum count.

9. The invention defined in claim 8 wherein the allowing means comprises;

A. gating means interconnecting the source of control pulses with the dividing counter and with the downcounter;

B. and, means controlled by the down counter for controlling the gating means so that control pulses are allowed to pass through the gating means to the dividing counter and to the down counter until the count in the down counter changes from zero count to maximum count.

10. The invention defined in claim 9 wherein the means for controlling the gating means comprises A. means controlled by the down counter for providing a stop signal when the count in the down counter changes from zero count to maximum count B. and means for applying the stop signal to the gating means to stop further control pulses from passing through the gating means to the dividing counter and to the down counter.

11. The invention defined in claim 10 wherein:

A. the means for causing the dividing counter to be reset to zero count comprises 1. a dividing counter reset terminal energizable to reset the dividing counter to zero 2. and a count comparator interconnected to the dividing counter and to the register and to the reset terminal for energizing the reset terminal whenever the count in the dividing counter equals the count in the register;

B. and, the means for causing the reset up counter to contain a registration indicative of the number of times the dividing counter is reset comprises interconnection of the reset terminal with the up counter so that the reset up counter counts the number of times the reset terminal is energized.

12. The invention defined in claim 10 further comprising logic circuitry A. connected to the dividing counter B. and controlled the by stop signal to derive from any count then remaining in the dividing counter a fraction signal representative of the approximate fraction the remaining count is of the count in the register.

13. The invention defined in claim 12 wherein the indicating means further comprises means controlled by the fraction signal for causing the reset up counter to also contain a registration indicative of the approximate fractional count.